US012388979B2

United States Patent
Zhao et al.

(10) Patent No.: US 12,388,979 B2
(45) Date of Patent: Aug. 12, 2025

(54) INTRABC USING WEDGELET PARTITIONING

(71) Applicant: Tencent America LLC, Palo Alto, CA (US)

(72) Inventors: Xin Zhao, San Jose, CA (US); Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 88 days.

(21) Appl. No.: 17/974,068

(22) Filed: Oct. 26, 2022

(65) Prior Publication Data

US 2023/0135166 A1 May 4, 2023

Related U.S. Application Data

(60) Provisional application No. 63/289,129, filed on Dec. 13, 2021, provisional application No. 63/273,074, filed on Oct. 28, 2021.

(51) Int. Cl.
*H04N 19/46* (2014.01)
*H04N 19/105* (2014.01)
(Continued)

(52) U.S. Cl.
CPC ......... *H04N 19/105* (2014.11); *H04N 19/159* (2014.11); *H04N 19/176* (2014.11); *H04N 19/46* (2014.11)

(58) Field of Classification Search
CPC .. H04N 19/105; H04N 19/159; H04N 19/176; H04N 19/46
See application file for complete search history.

(56) References Cited

U.S. PATENT DOCUMENTS 10,224,235 B2  3/2019  Park et al.
2014/0307787 A1* 10/2014 Zheng ............... H04N 19/14
                                                   375/240.12
(Continued)

FOREIGN PATENT DOCUMENTS

JP        2021-30019 A      3/2021
WO   WO-2020244503 A1 * 12/2020   ........... H04N 19/105

OTHER PUBLICATIONS

International Search Report and Written Opinion in International Application No. PCT/US22/48073 dated May 2, 2023, 9 pages.
(Continued)

*Primary Examiner* — Dave Czekaj
*Assistant Examiner* — Berteau Joisil
(74) *Attorney, Agent, or Firm* — Crowell & Moring LLP

(57) ABSTRACT

This disclosure relates generally to video coding and particularly to intra block copy coding mode using wedgelet partitioning. For example, a method is disclosed for processing video data which may include receiving a video bitstream comprising a current block of a video frame; extracting an IntraBC flag from the video bitstream indicating that the current block is predicted under an IntraBC mode; determining from the video bitstream that the current block is partitioned under a wedgelet partitioning mode, wherein the current block is partitioned into a plurality of partitions comprising a first partition and a second partition; identifying at least the first partition and the second partition of the current block; determining a first block vector for predicting the first partition and a second block vector for predicting the second partition, respectively; and decoding the current block based on at least the first block vector and second block vector.

14 Claims, 27 Drawing Sheets

(51) Int. Cl.
*H04N 19/159* (2014.01)
*H04N 19/176* (2014.01)

(56) References Cited

U.S. PATENT DOCUMENTS

| 2017/0070748 A1* | 3/2017 | Li ........................ H04N 19/115 |
| 2017/0310987 A1* | 10/2017 | Wu ........................ H04N 19/51 |
| 2023/0300337 A1* | 9/2023 | Deng ................... H04N 19/157 |
| | | 375/240.02 |

OTHER PUBLICATIONS

Japanese Office Action with English translation, Aug. 20, 2024, pp. 1-11, issued in Japanese Patent Application 2023-552244, Japan Patent Office.
Bross, Benjamin, et al., Versatile Video Coding (Draft 8), Jan. 7-17, 2020, pp. 1-0 Joint Video Experts Team (JVET) of ITU-T SG 16 WP 3 and ISO/IEC JTC1/SC 29/WG 11, JVET-Q2001-vD, Brussels.
Extended European Search Report issued n European Patent Application No. 22888196.7 dated Apr. 25, 2025, 12 pages.

* cited by examiner

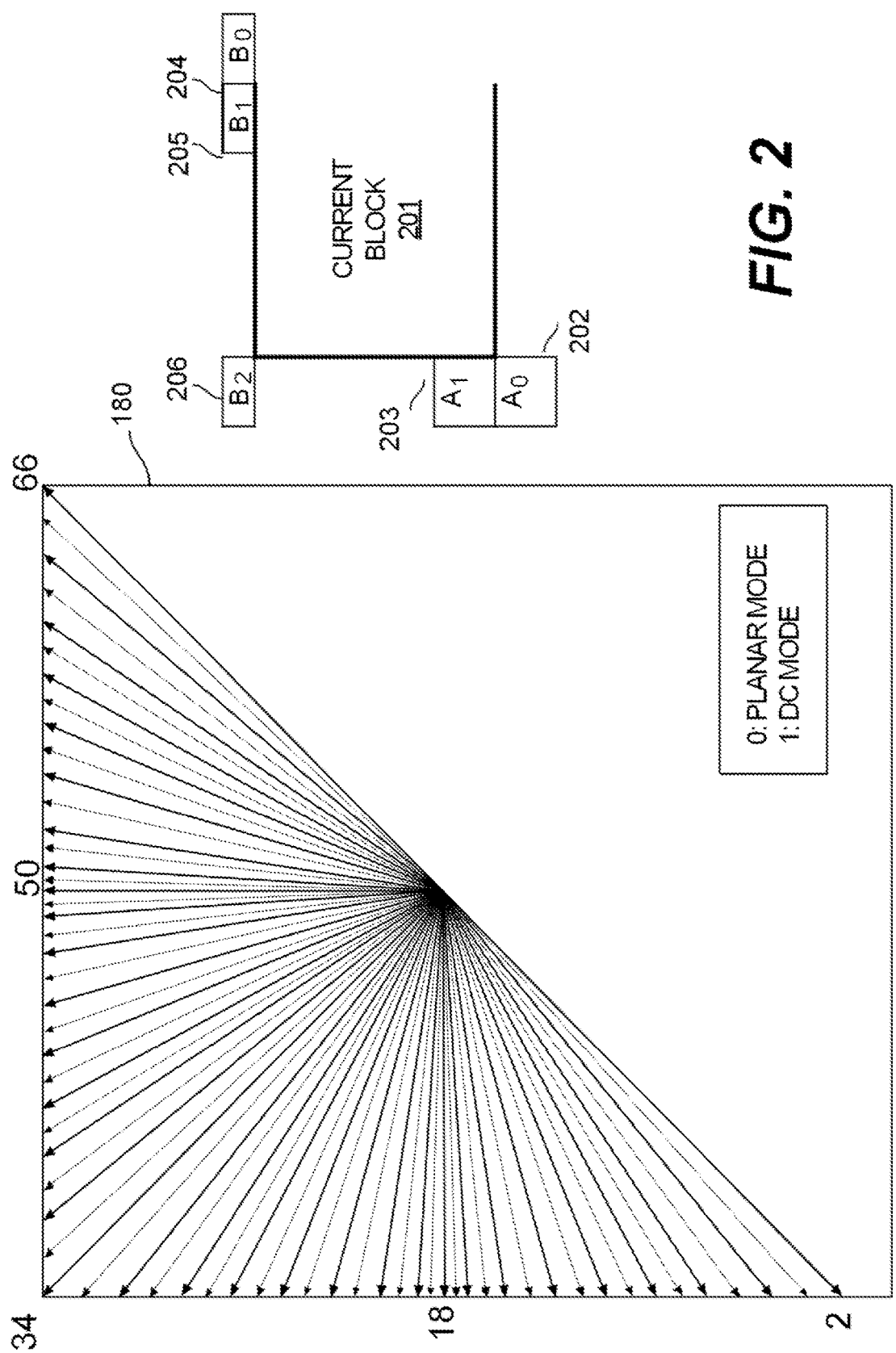

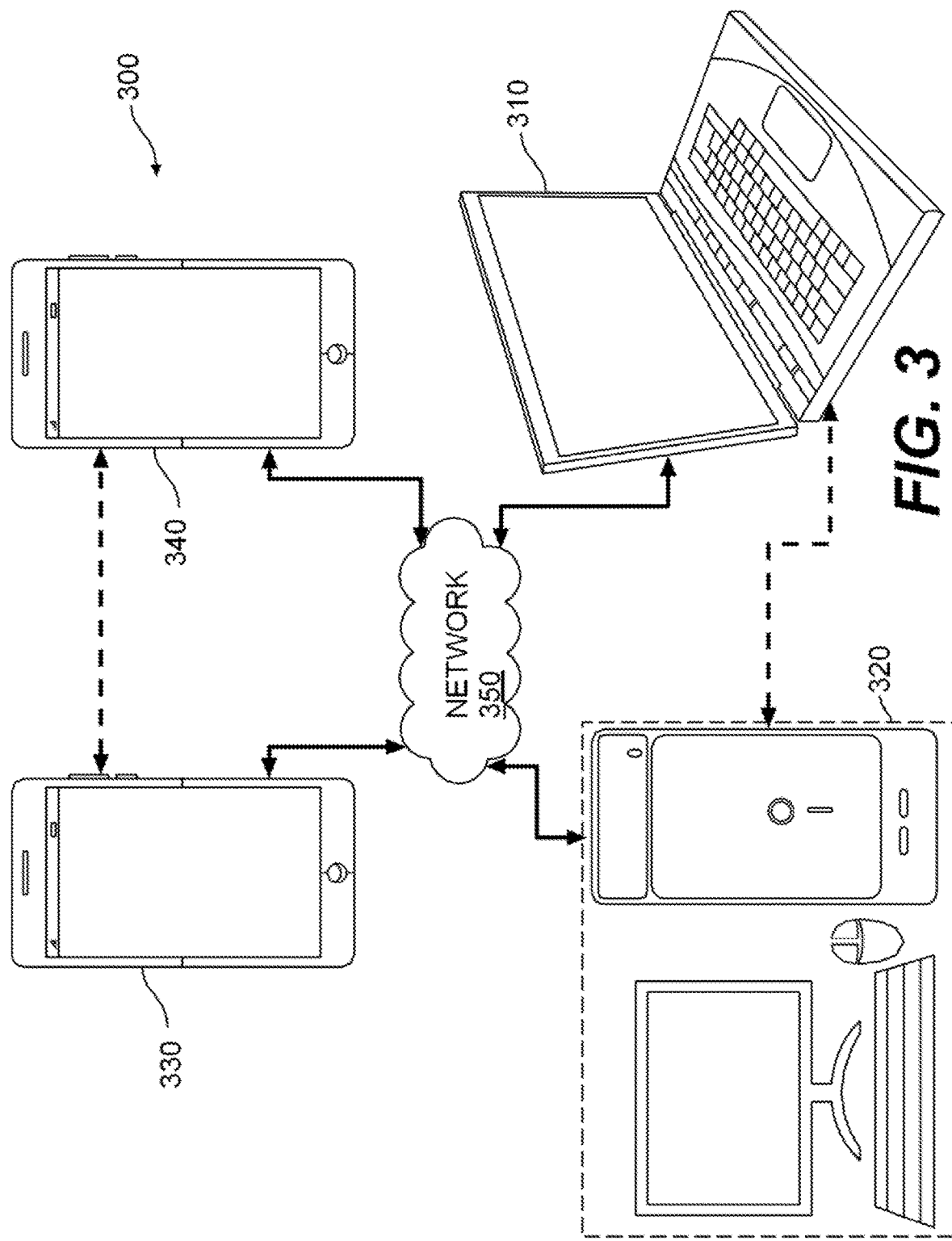

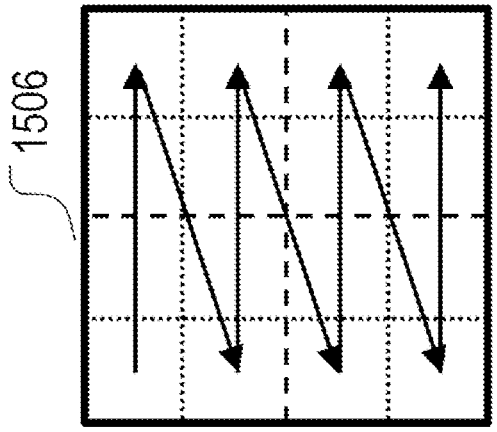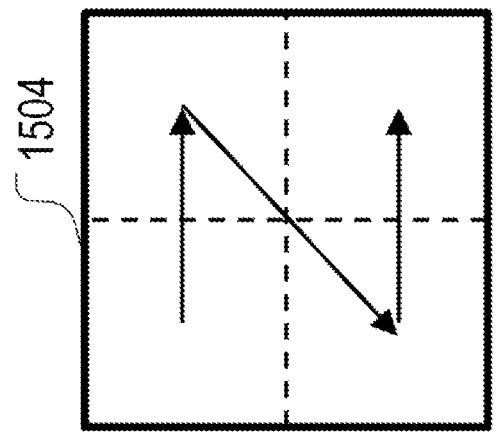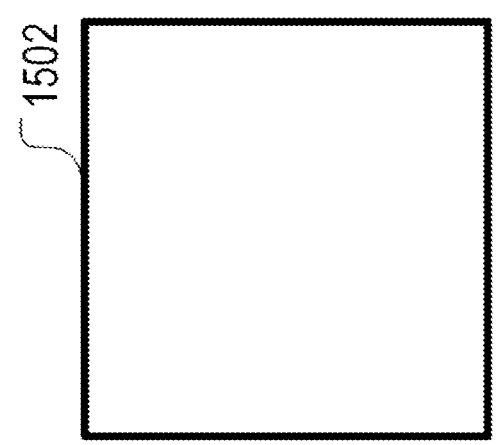
FIG. 15
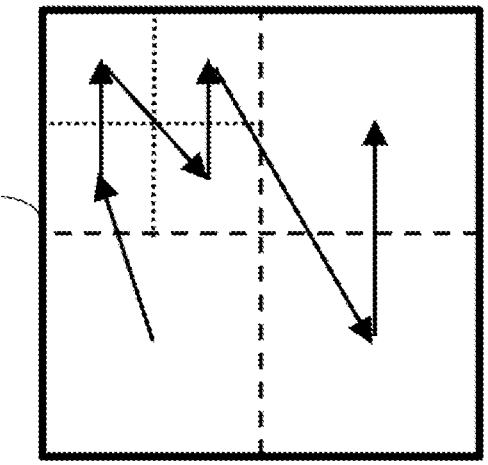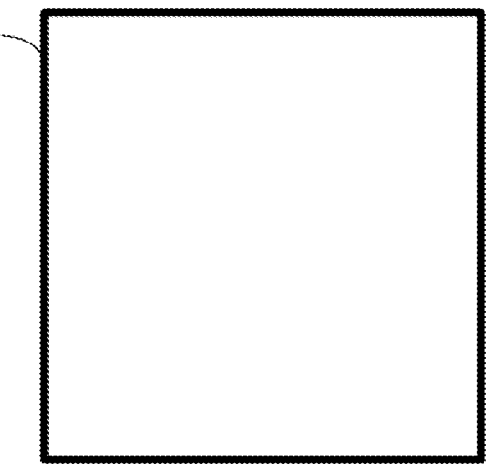
FIG. 16

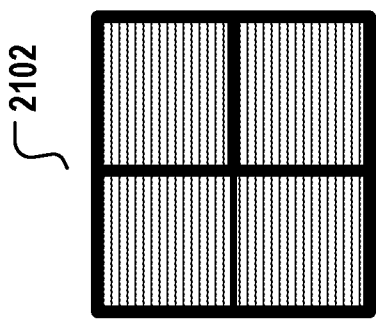
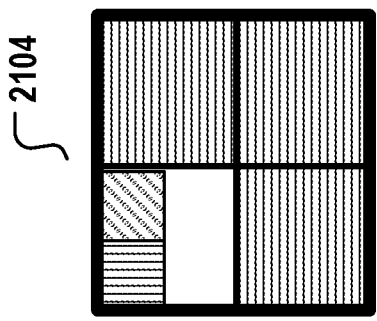
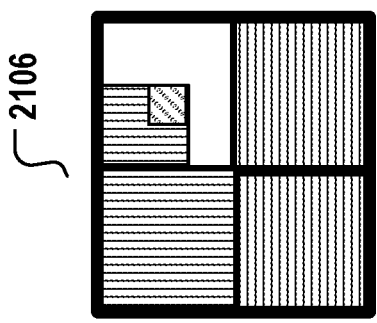
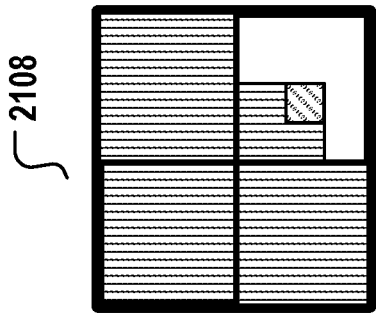
*FIG. 21*
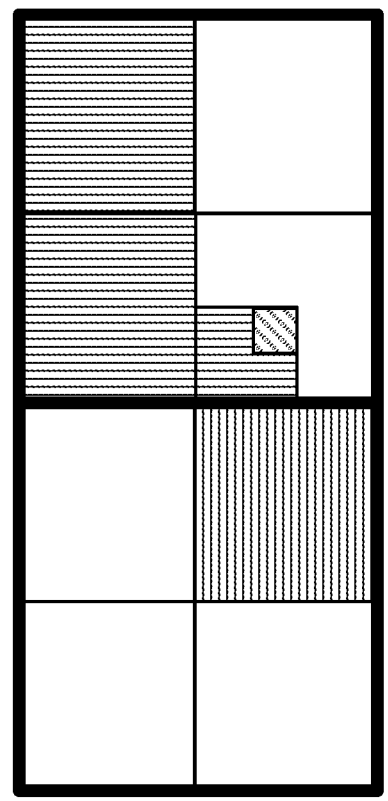
*FIG. 22*

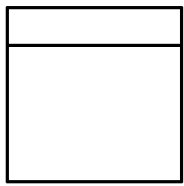(a)
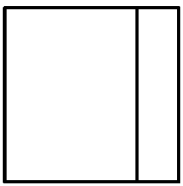(b)
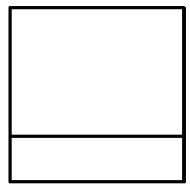(c)
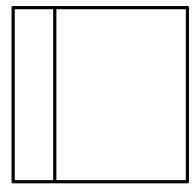(d)
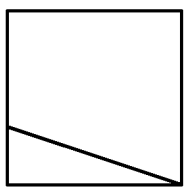(e)
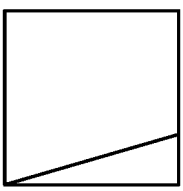(f)
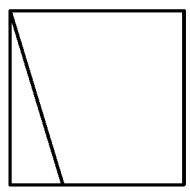(g)
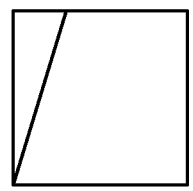(h)
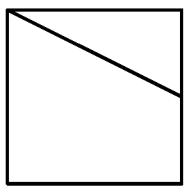(i)
(j)
(k)
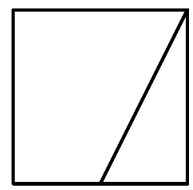(l)
(m)
(n)
(o)
(p)
FIG. 27

INTRABC USING WEDGELET PARTITIONING

INCORPORATION BY REFERENCE

This application is based on and claims the benefit of priority to U.S. Provisional Application No. 63/289,129, entitled "INTRABC USING WEDGELET PARTITIONING", filed on Dec. 13, 2021, and U.S. Provisional Application No. 63/273,074, entitled "INTRABC USING WEDGELET PARTITIONING", filed on Oct. 28, 2021, each of which is herein incorporated by reference in its entirety.

TECHNICAL FIELD

This disclosure describes a set of advanced video coding technologies. More specifically, the disclosed technology involves implementation of and enhancement on Intra Block Copy (IntraBC, or IBC) using wedgelet partition mode in video encoding and decoding.

BACKGROUND

This background description provided herein is for the purpose of generally presenting the context of the disclosure. Work of the presently named inventors, to the extent the work is described in this background section, as well as aspects of the description that may not otherwise qualify as prior art at the time of filing of this application, are neither expressly nor impliedly admitted as prior art against the present disclosure.

Video coding and decoding can be performed using inter-picture prediction with motion compensation. Uncompressed digital video can include a series of pictures, with each picture having a spatial dimension of, for example, 1920×1080 luminance samples and associated full or subsampled chrominance samples. The series of pictures can have a fixed or variable picture rate (alternatively referred to as frame rate) of, for example, 60 pictures per second or 60 frames per second. Uncompressed video has specific bitrate requirements for streaming or data processing. For example, video with a pixel resolution of 1920×1080, a frame rate of 60 frames/second, and a chroma subsampling of 4:2:0 at 8 bit per pixel per color channel requires close to 1.5 Gbit/s bandwidth. An hour of such video requires more than 600 GBytes of storage space.

One purpose of video coding and decoding can be the reduction of redundancy in the uncompressed input video signal, through compression. Compression can help reduce the aforementioned bandwidth and/or storage space requirements, in some cases, by two orders of magnitude or more. Both lossless compression and lossy compression, as well as a combination thereof can be employed. Lossless compression refers to techniques where an exact copy of the original signal can be reconstructed from the compressed original signal via a decoding process. Lossy compression refers to coding/decoding process where original video information is not fully retained during coding and not fully recoverable during decoding. When using lossy compression, the reconstructed signal may not be identical to the original signal, but the distortion between original and reconstructed signals is made small enough to render the reconstructed signal useful for the intended application albeit some information loss. In the case of video, lossy compression is widely employed in many applications. The amount of tolerable distortion depends on the application. For example, users of certain consumer video streaming applications may tolerate higher distortion than users of cinematic or television broadcasting applications. The compression ratio achievable by a particular coding algorithm can be selected or adjusted to reflect various distortion tolerance: higher tolerable distortion generally allows for coding algorithms that yield higher losses and higher compression ratios.

A video encoder and decoder can utilize techniques from several broad categories and steps, including, for example, motion compensation, Fourier transform, quantization, and entropy coding.

Video codec technologies can include techniques known as intra coding. In intra coding, sample values are represented without reference to samples or other data from previously reconstructed reference pictures. In some video codecs, a picture is spatially subdivided into blocks of samples. When all blocks of samples are coded in intra mode, that picture can be referred to as an intra picture. Intra pictures and their derivatives such as independent decoder refresh pictures, can be used to reset the decoder state and can, therefore, be used as the first picture in a coded video bitstream and a video session, or as a still image. The samples of a block after intra prediction can then be subject to a transform into frequency domain, and the transform coefficients so generated can be quantized before entropy coding. Intra prediction represents a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding such as that known from, for example, MPEG-2 generation coding technologies, does not use intra prediction. However, some newer video compression technologies include techniques that attempt coding/decoding of blocks based on, for example, surrounding sample data and/or metadata that are obtained during the encoding and/or decoding of spatially neighboring, and that precede in decoding order the blocks of data being intra coded or decoded. Such techniques are henceforth called "intra prediction" techniques. Note that in at least some cases, intra prediction uses reference data only from the current picture under reconstruction and not from other reference pictures.

There can be many different forms of intra prediction. When more than one of such techniques are available in a given video coding technology, the technique in use can be referred to as an intra prediction mode. One or more intra prediction modes may be provided in a particular codec. In certain cases, modes can have submodes and/or may be associated with various parameters, and mode/submode information and intra coding parameters for blocks of video can be coded individually or collectively included in mode codewords. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). Generally, for intra prediction, a predictor block can be formed using neighboring sample values that have become available. For example, available values of particular set of neighboring samples along certain direction and/or lines may be copied into the predictor block. A reference to the direction in use can be coded in the bitstream or may itself be predicted.

Referring to FIG. 1A, depicted in the lower right is a subset of nine predictor directions specified in H.265's 33 possible intra predictor directions (corresponding to the 33 angular modes of the 35 intra modes specified in H.265). The point where the arrows converge (101) represents the sample being predicted. The arrows represent the direction from which neighboring samples are used to predict the sample at 101. For example, arrow (102) indicates that sample (101) is predicted from a neighboring sample or samples to the upper right, at a 45 degree angle from the horizontal direction. Similarly, arrow (103) indicates that sample (101) is predicted from a neighboring sample or samples to the lower left of sample (101), in a 22.5 degree angle from the horizontal direction.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are example reference samples that follow a similar numbering scheme. A reference sample is labelled with an R, its Y position (e.g., row index) and X position (column index) relative to block (104). In both H.264 and H.265, prediction samples adjacently neighboring the block under reconstruction are used.

Intra picture prediction of block 104 may begin by copying reference sample values from the neighboring samples according to a signaled prediction direction. For example, assuming that the coded video bitstream includes signaling that, for this block 104, indicates a prediction direction of arrow (102)—that is, samples are predicted from a prediction sample or samples to the upper right, at a 45-degree angle from the horizontal direction. In such a case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has continued to develop. In H.264 (year 2003), for example, nine different direction are available for intra prediction. That increased to 33 in H.265 (year 2013), and JEM/VVC/BMS, at the time of this disclosure, can support up to 65 directions. Experimental studies have been conducted to help identify the most suitable intra prediction directions, and certain techniques in the entropy coding may be used to encode those most suitable directions in a small number of bits, accepting a certain bit penalty for directions. Further, the directions themselves can sometimes be predicted from neighboring directions used in the intra prediction of the neighboring blocks that have been decoded.

FIG. 1B shows a schematic (180) that depicts 65 intra prediction directions according to JEM to illustrate the increasing number of prediction directions in various encoding technologies developed over time.

The manner for mapping of bits representing intra prediction directions to the prediction directions in the coded video bitstream may vary from video coding technology to video coding technology; and can range, for example, from simple direct mappings of prediction direction to intra prediction mode, to codewords, to complex adaptive schemes involving most probable modes, and similar techniques. In all cases, however, there can be certain directions for intro prediction that are statistically less likely to occur in video content than certain other directions. As the goal of video compression is the reduction of redundancy, those less likely directions will, in a well-designed video coding technology, may be represented by a larger number of bits than more likely directions.

Inter picture prediction, or inter prediction may be based on motion compensation. In motion compensation, sample data from a previously reconstructed picture or part thereof (reference picture), after being spatially shifted in a direction indicated by a motion vector (MV henceforth), may be used for a prediction of a newly reconstructed picture or picture part (e.g., a block). In some cases, the reference picture can be the same as the picture currently under reconstruction. MVs may have two dimensions X and Y, or three dimensions, with the third dimension being an indication of the reference picture in use (akin to a time dimension).

In some video compression techniques, a current MV applicable to a certain area of sample data can be predicted from other MVs, for example from those other MVs that are related to other areas of the sample data that are spatially adjacent to the area under reconstruction and precede the current MV in decoding order. Doing so can substantially reduce the overall amount of data required for coding the MVs by relying on removing redundancy in correlated MVs, thereby increasing compression efficiency. MV prediction can work effectively, for example, because when coding an input video signal derived from a camera (known as natural video) there is a statistical likelihood that areas larger than the area to which a single MV is applicable move in a similar direction in the video sequence and, therefore, can in some cases be predicted using a similar motion vector derived from MVs of neighboring area. That results in the actual MV for a given area to be similar or identical to the MV predicted from the surrounding MVs. Such an MV in turn may be represented, after entropy coding, in a smaller number of bits than what would be used if the MV is coded directly rather than predicted from the neighboring MV(s). In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 specifies, described below is a technique henceforth referred to as "spatial merge".

Specifically, referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block uses.

SUMMARY

Aspects of the disclosure relates generally to video encoding and decoding, and particularly, to implementation of and enhancement on Intra Block Copy (IntraBC, or IBC) using wedgelet partition mode.

Aspects of the disclosure provides a method for processing video data. The method includes receiving a video bitstream comprising a current block of a video frame; extracting an Intra-Block Copy (IntraBC) flag from the video bitstream indicating that the current block is predicted under an IntraBC mode; determining from the video bitstream that the current block is partitioned under a wedgelet partitioning mode; identifying at least a first partition and a second partition of the current block; extracting a first block vector and a second block vector for the first partition and the second partition, respectively; and decoding the current block based on at least the first block vector and second block vector.

Aspects of the disclosure also provide another method for processing video data. The method includes receiving a video bitstream comprising a current block of a video frame, wherein the current block is predicted under an Intra-Block Copy (IntraBC) mode using compound prediction; determining that the current block is partitioned into at least a first partition and a second partition under a wedgelet partitioning mode; determining at least two reference blocks for the first partition; determining a compound reference block based on a weighted sum of the at least two reference blocks; and reconstructing the first partition based on the compound reference block.

Aspects of the disclosure also provide a video encoding or decoding device or apparatus including a circuitry configured to carry out any of the method implementations above.

Aspects of the disclosure also provide non-transitory computer-readable mediums storing instructions which when executed by a computer for video decoding and/or encoding cause the computer to perform the methods for video decoding and/or encoding.

BRIEF DESCRIPTION OF THE DRAWINGS

Further features, the nature, and various advantages of the disclosed subject matter will be more apparent from the following detailed description and the accompanying drawings in which:

FIG. 1B shows an illustration of exemplary intra prediction directions;

FIG. 2 shows a schematic illustration of a current block and its surrounding spatial merge candidates for motion vector prediction in one example;

FIG. 3 shows a schematic illustration of a simplified block diagram of a communication system (300) in accordance with an example embodiment;

FIG. 15 shows a scheme for partitioning a coding block into multiple transform blocks and coding order of the transform blocks according to example embodiments of the disclosure;

FIG. 16 shows another scheme for partitioning a coding block into multiple transform blocks and coding order of the transform block according to example embodiments of the disclosure;

FIG. 21 illustrates an example on-chip Reference Sample Memory (RSM) updating mechanism for IBC;

FIG. 22 illustrates a spatial view of the example on-chip RSM updating mechanism of FIG. 21;

FIG. 27 shows example wedgelet partitioning patterns with various portioning boundary.

DETAILED DESCRIPTION OF EMBODIMENTS

Figure 1A:
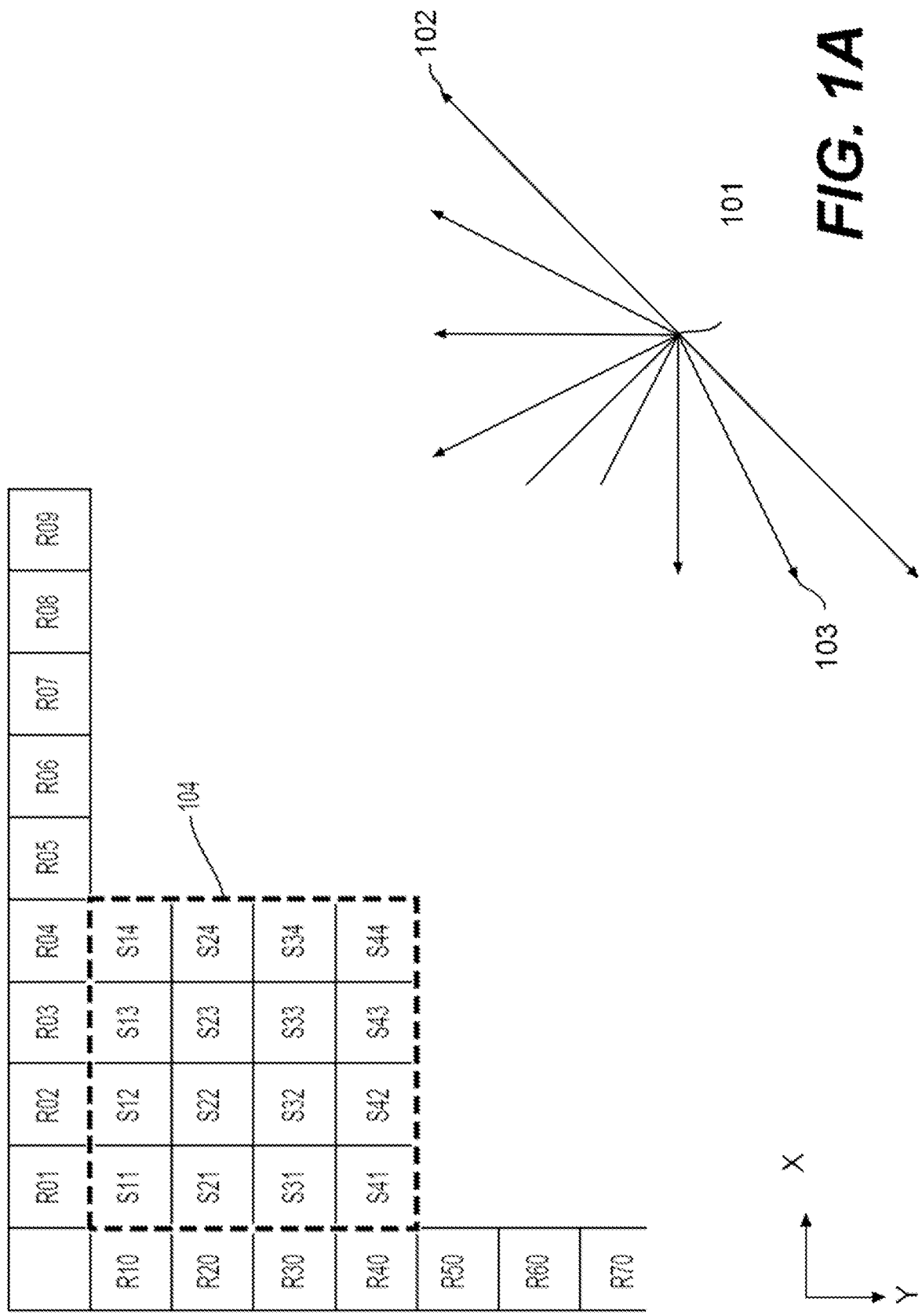
FIG. 1A shows a schematic illustration of an exemplary subset of intra prediction directional modes.

The invention will now be described in detail hereinafter with reference to the accompanied drawings, which form a part of the present invention, and which show, by way of illustration, specific examples of embodiments. Please note that the invention may, however, be embodied in a variety of different forms and, therefore, the covered or claimed subject matter is intended to be construed as not being limited to any of the embodiments to be set forth below. Please also note that the invention may be embodied as methods, devices, components, or systems. Accordingly, embodiments of the invention may, for example, take the form of hardware, software, firmware or any combination thereof.

Throughout the specification and claims, terms may have nuanced meanings suggested or implied in context beyond an explicitly stated meaning. The phrase "in one embodiment" or "in some embodiments" as used herein does not necessarily refer to the same embodiment and the phrase "in another embodiment" or "in other embodiments" as used herein does not necessarily refer to a different embodiment. Likewise, the phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

FIG. 3 illustrates a simplified block diagram of a communication system (300) according to an embodiment of the present disclosure. The communication system (300) includes a plurality of terminal devices that can communicate with each other, via, for example, a network (350). For example, the communication system (300) includes a first pair of terminal devices (310) and (320) interconnected via the network (350). In the example of FIG. 3, the first pair of terminal devices (310) and (320) may perform unidirectional transmission of data. For example, the terminal device (310) may code video data (e.g., of a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display the video pictures according to the recovered video data. Unidirectional data transmission may be implemented in media serving applications and the like.

In another example, the communication system (300) includes a second pair of terminal devices (330) and (340) that perform bidirectional transmission of coded video data that may be implemented, for example, during a videoconferencing application. For bidirectional transmission of data, in an example, each terminal device of the terminal devices (330) and (340) may code video data (e.g., of a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display the video pictures at an accessible display device according to the recovered video data.

In the example of FIG. 3, the terminal devices (310), (320), (330) and (340) may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (350) represents any number or types of networks that convey coded video data among the terminal devices (310), (320), (330) and (340), including for example wireline (wired) and/or wireless communication networks. The communication network (350)9 may exchange data in circuit-switched, packet-switched, and/or other types of channels. Representative networks include telecommunications networks, local area networks, wide area networks and/or the Internet. For the purposes of the present discussion, the architecture and topology of the network (350) may be immaterial to the operation of the present disclosure unless explicitly explained herein.

Figure 4:
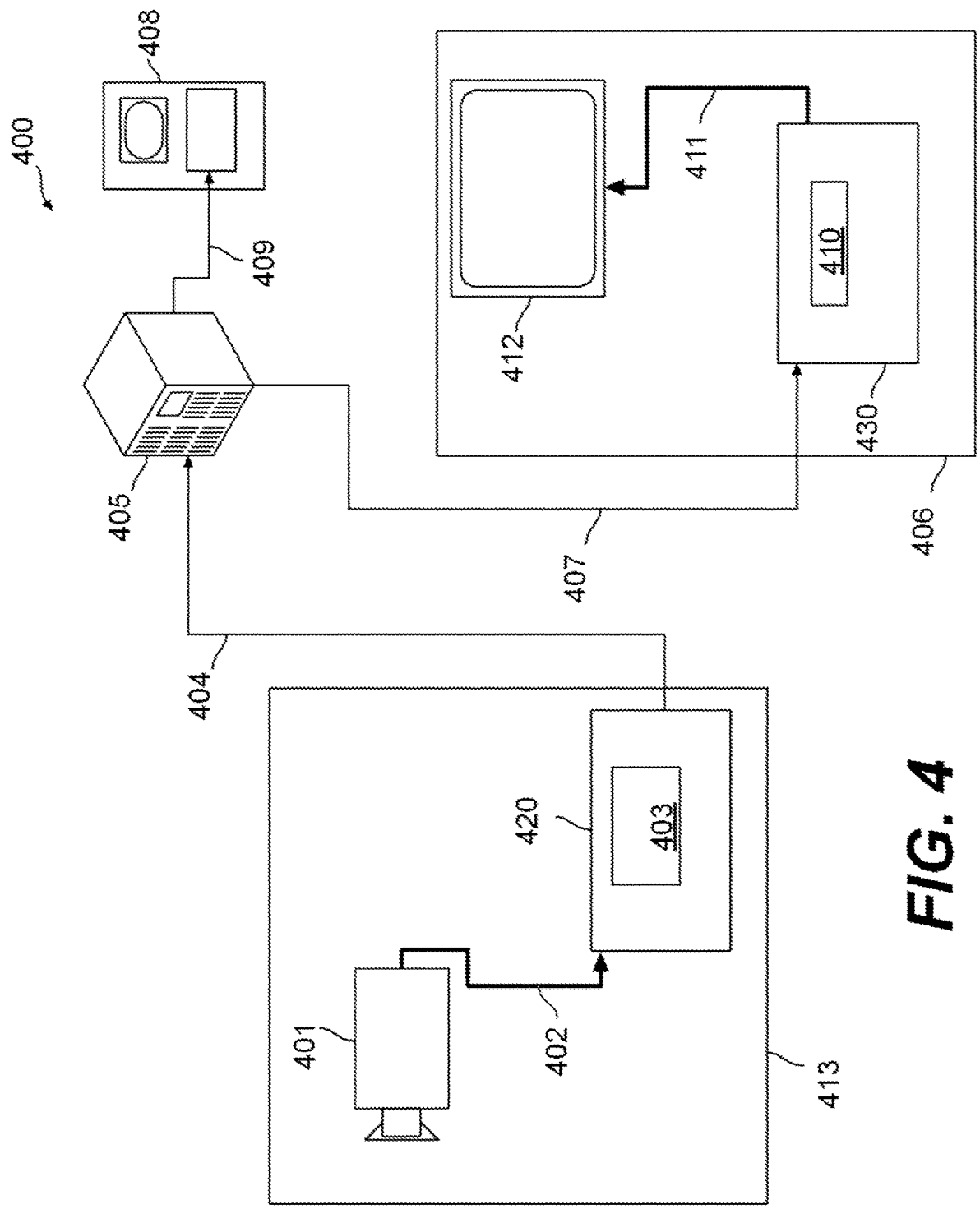
FIG. 4 shows a schematic illustration of a simplified block diagram of a communication system (400) in accordance with an example embodiment.

FIG. 4 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

A video streaming system may include a video capture subsystem (413) that can include a video source (401), e.g., a digital camera, for creating a stream of video pictures or images (402) that are uncompressed. In an example, the stream of video pictures (402) includes samples that are recorded by a digital camera of the video source 401. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream (404)), depicted as a thin line to emphasize a lower data volume when compared to the stream of uncompressed video pictures (402), can be stored on a streaming server (405) for future use or directly to downstream video devices (not shown). One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that are uncompressed and that can be rendered on a display (412) (e.g., a display screen) or other rendering devices (not depicted). The video decoder 410 may be configured to perform some or all of the various functions described in this disclosure. In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC, and other video coding standards.

It is noted that the electronic devices (420) and (430) can include other components (not shown). For example, the electronic device (420) can include a video decoder (not shown) and the electronic device (430) can include a video encoder (not shown) as well.

Figure 5:
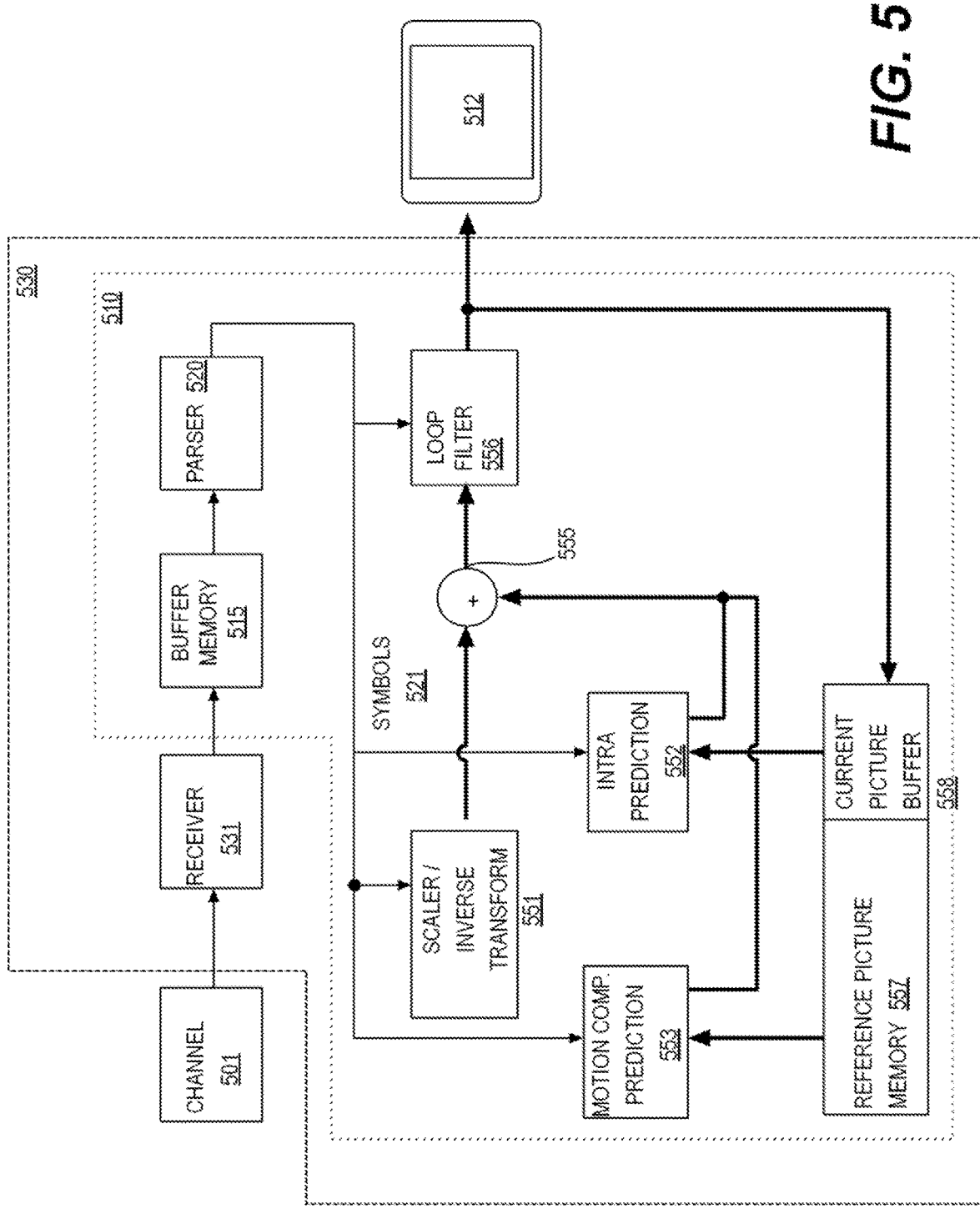
FIG. 5 shows a schematic illustration of a simplified block diagram of a video decoder in accordance with an example embodiment.

FIG. 5 shows a block diagram of a video decoder (510) according to any embodiment of the present disclosure below. The video decoder (510) can be included in an electronic device (530). The electronic device (530) can include a receiver (531) (e.g., receiving circuitry). The video decoder (510) can be used in place of the video decoder (410) in the example of FIG. 4.

The receiver (531) may receive one or more coded video sequences to be decoded by the video decoder (510). In the same or another embodiment, one coded video sequence may be decoded at a time, where the decoding of each coded video sequence is independent from other coded video sequences. Each video sequence may be associated with multiple video frames or images. The coded video sequence may be received from a channel (501), which may be a hardware/software link to a storage device which stores the encoded video data or a streaming source which transmits the encoded video data. The receiver (531) may receive the encoded video data with other data such as coded audio data and/or ancillary data streams, that may be forwarded to their respective processing circuitry (not depicted). The receiver (531) may separate the coded video sequence from the other data. To combat network jitter, a buffer memory (515) may be disposed in between the receiver (531) and an entropy decoder/parser (520) ("parser (520)" henceforth). In certain applications, the buffer memory (515) may be implemented as part of the video decoder (510). In other applications, it can be outside of and separate from the video decoder (510) (not depicted). In still other applications, there can be a buffer memory (not depicted) outside of the video decoder (510) for the purpose of, for example, combating network jitter, and there may be another additional buffer memory (515) inside the video decoder (510), for example to handle playback timing. When the receiver (531) is receiving data from a store/forward device of sufficient bandwidth and controllability, or from an isosynchronous network, the buffer memory (515) may not be needed, or can be small. For use on best-effort packet networks such as the Internet, the buffer memory (515) of sufficient size may be required, and its size can be comparatively large. Such buffer memory may be implemented with an adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as display (512) (e.g., a display screen) that may or may not an integral part of the electronic device (530) but can be coupled to the electronic device (530), as is shown in FIG. 5. The control information for the rendering device(s) may be in the form of Supplemental Enhancement Information (SEI messages) or Video Usability Information (VUI) parameter set fragments (not depicted). The parser (520) may parse/entropy-decode the coded video sequence that is received by the parser (520). The entropy coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the subgroups. The subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients (e.g., Fourier transform coefficients), quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different processing or functional units depending on the type of the coded video picture or parts thereof (such as: inter and intra picture, inter and intra block), and other factors. The units that are involved and how they are involved may be controlled by the subgroup control information that was parsed from the coded video sequence by the parser (520). The flow of such subgroup control information between the parser (520) and the multiple processing or functional units below is not depicted for simplicity.

Beyond the functional blocks already mentioned, the video decoder (510) can be conceptually subdivided into a number of functional units as described below. In a practical implementation operating under commercial constraints, many of these functional units interact closely with each other and can, at least partly, be integrated with one another. However, for the purpose of describing the various functions of the disclosed subject matter with clarity, the conceptual subdivision into the functional units is adopted in the disclosure below.

A first unit may include the scaler/inverse transform unit (551). The scaler/inverse transform unit (551) may receive a quantized transform coefficient as well as control information, including information indicating which type of inverse transform to use, block size, quantization factor/parameters, quantization scaling matrices, and the lie as symbol(s) (521) from the parser (520). The scaler/inverse transform unit (551) can output blocks comprising sample values that can be input into aggregator (555).

In some cases, the output samples of the scaler/inverse transform (551) can pertain to an intra coded block, i.e., a block that does not use predictive information from previously reconstructed pictures, but can use predictive information from previously reconstructed parts of the current picture. Such predictive information can be provided by an intra picture prediction unit (552). In some cases, the intra picture prediction unit (552) may generate a block of the same size and shape of the block under reconstruction using surrounding block information that is already reconstructed and stored in the current picture buffer (558). The current picture buffer (558) buffers, for example, partly reconstructed current picture and/or fully reconstructed current picture. The aggregator (555), in some implementations, may add, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated block. In such a case, a motion compensation prediction unit (553) can access reference picture memory (557) to fetch samples used for inter-picture prediction. After motion compensating the fetched samples in accordance with the symbols (521) pertaining to the block, these samples can be added by the aggregator (555) to the output of the scaler/inverse transform unit (551) (output of unit 551 may be referred to as the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y components (shift), and reference picture components (time). Motion compensation may also include interpolation of sample values as fetched from the reference picture memory (557) when sub-sample exact motion vectors are in use, and may also be associated with motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520), but can also be responsive to meta-information obtained during the decoding of previous (in decoding order) parts of the coded picture or coded video sequence, as well as responsive to previously reconstructed and loop-filtered sample values. Several type of loop filters may be included as part of the loop filter unit 556 in various orders, as will be described in further detail below.

The output of the loop filter unit (556) can be a sample stream that can be output to the rendering device (512) as well as stored in the reference picture memory (557) for use in future inter-picture prediction.

Certain coded pictures, once fully reconstructed, can be used as reference pictures for future inter-picture prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology adopted in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools from all the tools available in the video compression technology or standard as the only tools available for use under that profile. To be standard-compliant, the complexity of the coded video sequence may be within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In some example embodiments, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
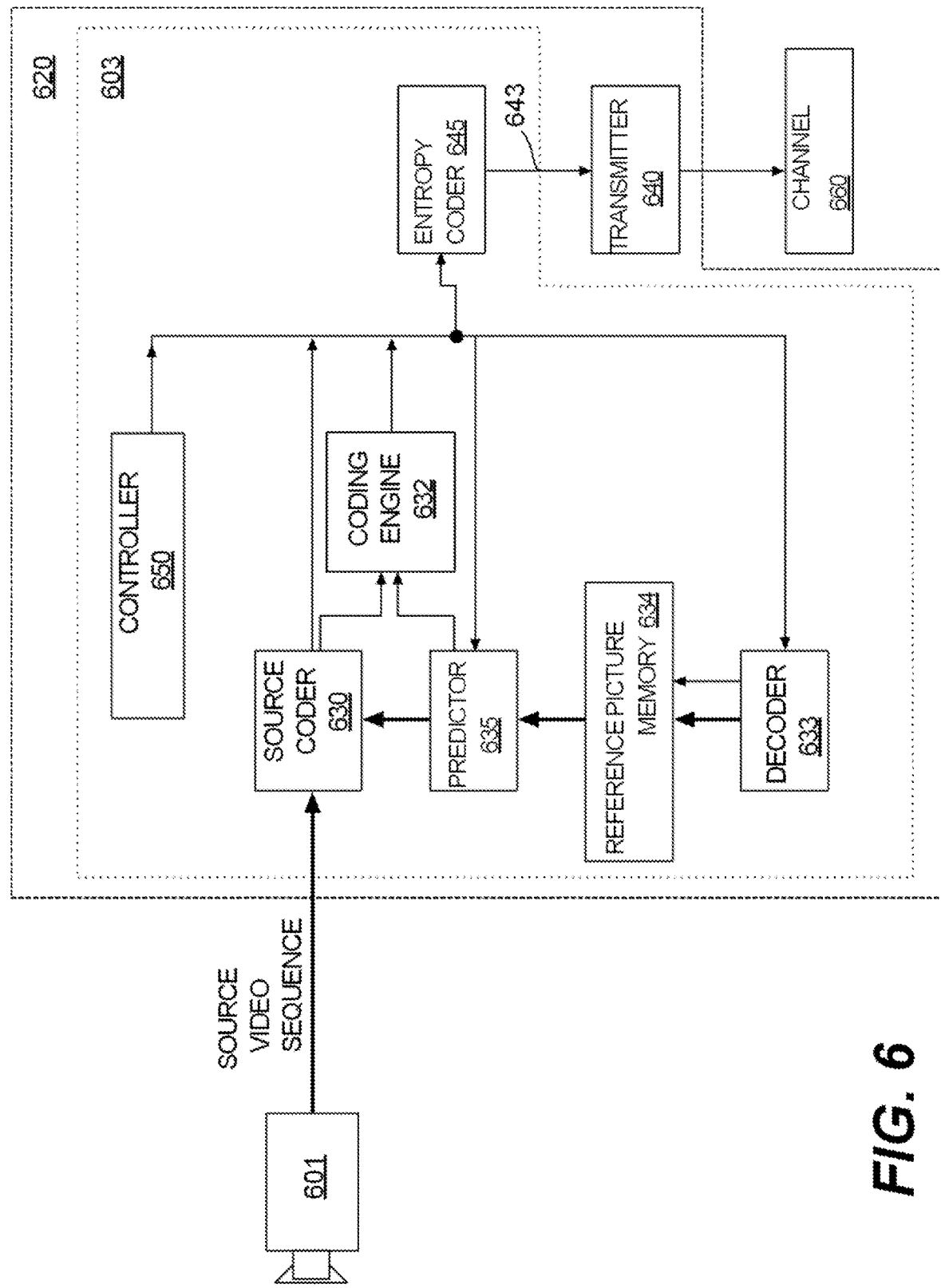
FIG. 6 shows a schematic illustration of a simplified block diagram of a video encoder in accordance with an example embodiment.

FIG. 6 shows a block diagram of a video encoder (603) according to an example embodiment of the present disclosure. The video encoder (603) may be included in an electronic device (620). The electronic device (620) may further include a transmitter (640) (e.g., transmitting circuitry). The video encoder (603) can be used in place of the video encoder (403) in the example of FIG. 4.

The video encoder (603) may receive video samples from a video source (601) (that is not part of the electronic device (620) in the example of FIG. 6) that may capture video image(s) to be coded by the video encoder (603). In another example, the video source (601) may be implemented as a portion of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 YCrCb, RGB, XYZ . . . ), and any suitable sampling structure (for example YCrCb 4:2:0, YCrCb 4:4:4). In a media serving system, the video source (601) may be a storage device capable of storing previously prepared video. In a videoconferencing system, the video source (601) may be a camera that captures local image information as a video sequence. Video data may be provided as a plurality of individual pictures or images that impart motion when viewed in sequence. The pictures themselves may be organized as a spatial array of pixels, wherein each pixel can comprise one or more samples depending on the sampling structure, color space, and the like being in use. A person having ordinary skill in the art can readily understand the relationship between pixels and samples. The description below focuses on samples.

According to some example embodiments, the video encoder (603) may code and compress the pictures of the source video sequence into a coded video sequence (643) in real time or under any other time constraints as required by the application. Enforcing appropriate coding speed constitutes one function of a controller (650). In some embodiments, the controller (650) may be functionally coupled to and control other functional units as described below. The coupling is not depicted for simplicity. Parameters set by the controller (650) can include rate control related parameters (picture skip, quantizer, lambda value of rate-distortion optimization techniques, . . . ), picture size, group of pictures (GOP) layout, maximum motion vector search range, and the like. The controller (650) can be configured to have other suitable functions that pertain to the video encoder (603) optimized for a certain system design.

In some example embodiments, the video encoder (603) may be configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder would create even though the embedded decoder 633 process coded video steam by the source coder 630 without entropy coding (as any compression between symbols and coded video bitstream in entropy coding may be lossless in the video compression technologies considered in the disclosed subject matter). The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used to improve coding quality.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633) in the encoder.

An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (630) may perform motion compensated predictive coding, which codes an input picture predictively with reference to one or more previously coded picture from the video sequence that were designated as "reference pictures." In this manner, the coding engine (632) codes differences (or residue) in the color channels between pixel blocks of an input picture and pixel blocks of reference picture(s) that may be selected as prediction reference(s) to the input picture. The term "residue" and its adjective form "residual" may be used interchangeably.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture cache (634). In this manner, the video encoder (603) may store copies of reconstructed reference pictures locally that have common content as the reconstructed reference pictures that will be obtained by a far-end (remote) video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by lossless compression of the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video coder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person having ordinary skill in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample coding blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures. The source pictures or the intermediate processed pictures may be subdivided into other types of blocks for other purposes. The division of coding blocks and the other types of blocks may or may not follow the same manner, as described in further detail below.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data may accordingly conform to a syntax specified by the video coding technology or standard being used.

In some example embodiments, the transmitter (640) may transmit additional data with the encoded video. The source coder (630) may include such data as part of the coded video sequence. The additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) utilizes spatial correlation in a given picture, and inter-picture prediction utilizes temporal or other correlation between the pictures. For example, a specific picture under encoding/decoding, which is referred to as a current picture, may be partitioned into blocks. A block in the current picture, when similar to a reference block in a previously coded and still buffered reference picture in the video, may be coded by a vector that is referred to as a motion vector. The motion vector points to the reference block in the reference picture, and can have a third dimension identifying the reference picture, in case multiple reference pictures are in use.

In some example embodiments, a bi-prediction technique can be used for inter-picture prediction. According to such bi-prediction technique, two reference pictures, such as a first reference picture and a second reference picture that both proceed the current picture in the video in decoding order (but may be in the past or future, respectively, in display order) are used. A block in the current picture can be coded by a first motion vector that points to a first reference block in the first reference picture, and a second motion vector that points to a second reference block in the second reference picture. The block can be jointly predicted by a combination of the first reference block and the second reference block.

Further, a merge mode technique may be used in the inter-picture prediction to improve coding efficiency.

According to some example embodiments of the disclosure, predictions, such as inter-picture predictions and intra-picture predictions are performed in the unit of blocks. For example, a picture in a sequence of video pictures is partitioned into coding tree units (CTU) for compression, the CTUs in a picture may have the same size, such as 128×128 pixels, 64×64 pixels, 32×32 pixels, or 16×16 pixels. In general, a CTU may include three parallel coding tree blocks (CTBs): one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels. Each of the one or more of the 32×32 block may be further split into 4 CUs of 16×16 pixels. In some example embodiments, each CU may be analyzed during encoding to determine a prediction type for the CU among various prediction types such as an inter prediction type or an intra prediction type. The CU may be split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. The split of a CU into PU (or PBs of different color channels) may be performed in various spatial pattern. A luma or chroma PB, for example, may include a matrix of values (e.g., luma values) for samples, such as 8×8 pixels, 16×16 pixels, 8×16 pixels, 16×8 samples, and the like.

Figure 7:
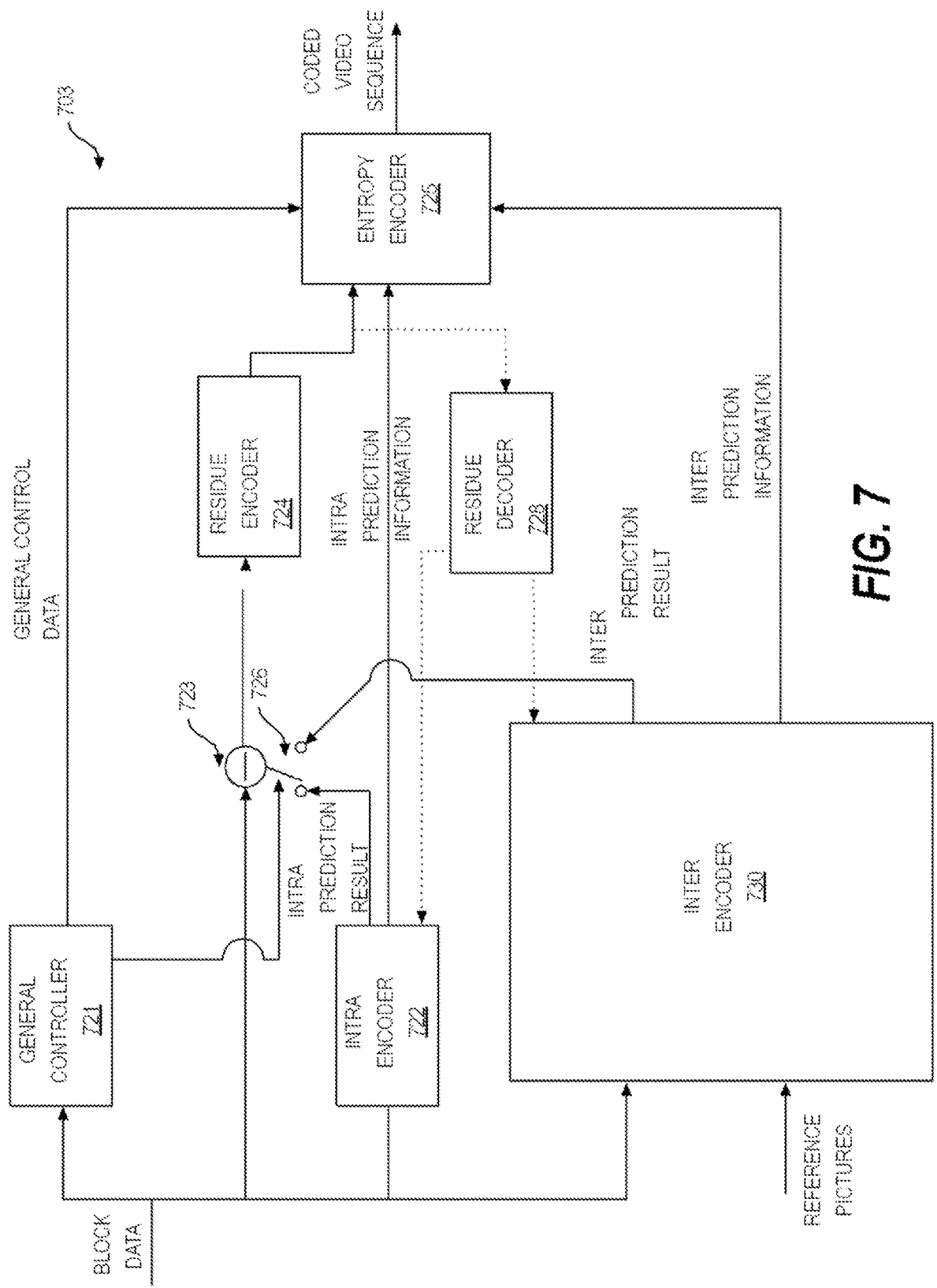
FIG. 7 shows a block diagram of a video encoder in accordance with another example embodiment.

FIG. 7 shows a diagram of a video encoder (703) according to another example embodiment of the disclosure. The video encoder (703) is configured to receive a processing block (e.g., a prediction block) of sample values within a current video picture in a sequence of video pictures, and encode the processing block into a coded picture that is part of a coded video sequence. The example video encoder (703) may be used in place of the video encoder (403) in the FIG. 4 example.

For example, the video encoder (703) receives a matrix of sample values for a processing block, such as a prediction block of 8×8 samples, and the like. The video encoder (703) then determines whether the processing block is best coded using intra mode, inter mode, or bi-prediction mode using, for example, rate-distortion optimization (RDO). When the processing block is determined to be coded in intra mode, the video encoder (703) may use an intra prediction technique to encode the processing block into the coded picture; and when the processing block is determined to be coded in inter mode or bi-prediction mode, the video encoder (703) may use an inter prediction or bi-prediction technique, respectively, to encode the processing block into the coded picture. In some example embodiments, a merge mode may be used as a submode of the inter picture prediction where the motion vector is derived from one or more motion vector predictors without the benefit of a coded motion vector component outside the predictors. In some other example embodiments, a motion vector component applicable to the subject block may be present. Accordingly, the video encoder (703) may include components not explicitly shown in FIG. 7, such as a mode decision module, to determine the perdition mode of the processing blocks.

In the example of FIG. 7, the video encoder (703) includes an inter encoder (730), an intra encoder (722), a residue calculator (723), a switch (726), a residue encoder (724), a general controller (721), and an entropy encoder (725) coupled together as shown in the example arrangement in FIG. 7.

The inter encoder (730) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information using the decoding unit 633 embedded in the example encoder 620 of FIG. 6 (shown as residual decoder 728 of FIG. 7, as described in further detail below).

The intra encoder (722) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques). The intra encoder (722) may calculates intra prediction results (e.g., predicted block) based on the intra prediction information and reference blocks in the same picture.

The general controller (721) may be configured to determine general control data and control other components of the video encoder (703) based on the general control data. In an example, the general controller (721) determines the prediction mode of the block, and provides a control signal to the switch (726) based on the prediction mode. For example, when the prediction mode is the intra mode, the general controller (721) controls the switch (726) to select the intra mode result for use by the residue calculator (723), and controls the entropy encoder (725) to select the intra prediction information and include the intra prediction information in the bitstream; and when the predication mode for the block is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) may be configured to calculate a difference (residue data) between the received block and prediction results for the block selected from the intra encoder (722) or the inter encoder (730). The residue encoder (724) may be configured to encode the residue data to generate transform coefficients. For example, the residue encoder (724) may be configured to convert the residue data from a spatial domain to a frequency domain to generate the transform coefficients. The transform coefficients are then subject to quantization processing to obtain quantized transform coefficients. In various example embodiments, the video encoder (703) also includes a residual decoder (728). The residual decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures.

The entropy encoder (725) may be configured to format the bitstream to include the encoded block and perform entropy coding. The entropy encoder (725) is configured to include in the bitstream various information. For example, the entropy encoder (725) may be configured to include the general control data, the selected prediction information (e.g., intra prediction information or inter prediction information), the residue information, and other suitable information in the bitstream. When coding a block in the merge submode of either inter mode or bi-prediction mode, there may be no residue information.

Figure 8:
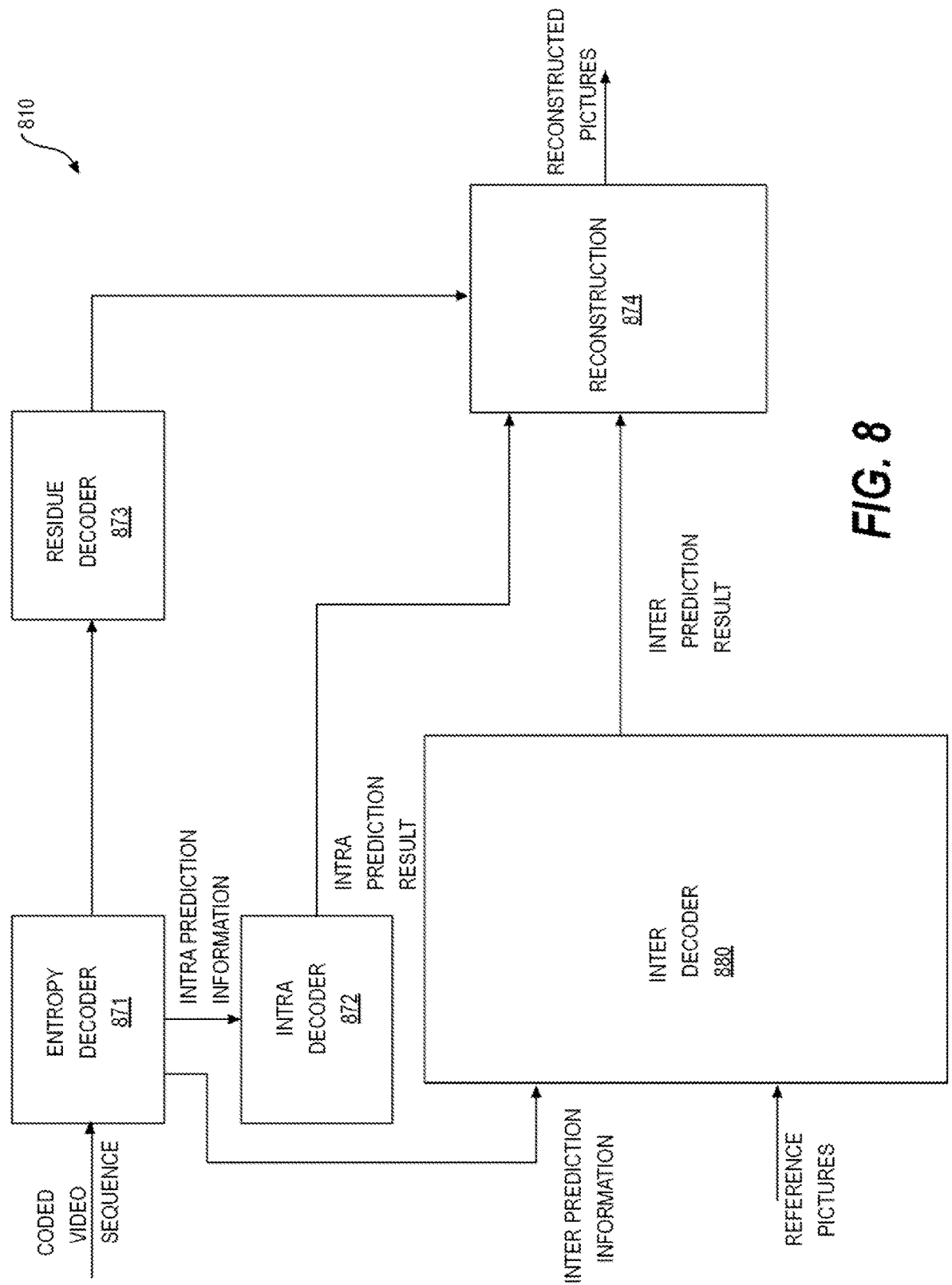
FIG. 8 shows a block diagram of a video decoder in accordance with another example embodiment.

FIG. 8 shows a diagram of an example video decoder (810) according to another embodiment of the disclosure. The video decoder (810) is configured to receive coded pictures that are part of a coded video sequence, and decode the coded pictures to generate reconstructed pictures. In an example, the video decoder (810) may be used in place of the video decoder (410) in the example of FIG. 4.

In the example of FIG. 8, the video decoder (810) includes an entropy decoder (871), an inter decoder (880), a residual decoder (873), a reconstruction module (874), and an intra decoder (872) coupled together as shown in the example arrangement of FIG. 8.

The entropy decoder (871) can be configured to reconstruct, from the coded picture, certain symbols that represent the syntax elements of which the coded picture is made up. Such symbols can include, for example, the mode in which a block is coded (e.g., intra mode, inter mode, bi-predicted mode, merge submode or another submode), prediction information (e.g., intra prediction information or inter prediction information) that can identify certain sample or metadata used for prediction by the intra decoder (872) or the inter decoder (880), residual information in the form of, for example, quantized transform coefficients, and the like. In an example, when the prediction mode is the inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residual decoder (873).

The inter decoder (880) may be configured to receive the inter prediction information, and generate inter prediction results based on the inter prediction information.

The intra decoder (872) may be configured to receive the intra prediction information, and generate prediction results based on the intra prediction information.

The residual decoder (873) may be configured to perform inverse quantization to extract de-quantized transform coefficients, and process the de-quantized transform coefficients to convert the residual from the frequency domain to the spatial domain. The residual decoder (873) may also utilize certain control information (to include the Quantizer Parameter (QP)) which may be provided by the entropy decoder (871) (data path not depicted as this may be low data volume control information only).

The reconstruction module (874) may be configured to combine, in the spatial domain, the residual as output by the residual decoder (873) and the prediction results (as output by the inter or intra prediction modules as the case may be) to form a reconstructed block forming part of the reconstructed picture as part of the reconstructed video. It is noted that other suitable operations, such as a deblocking operation and the like, may also be performed to improve the visual quality.

It is noted that the video encoders (403), (603), and (703), and the video decoders (410), (510), and (810) can be implemented using any suitable technique. In some example embodiments, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Turning to block partitioning for coding and decoding, general partitioning may start from a base block and may follow a predefined ruleset, particular patterns, partition trees, or any partition structure or scheme. The partitioning may be hierarchical and recursive. After dividing or partitioning a base block following any of the example partitioning procedures or other procedures described below, or the combination thereof, a final set of partitions or coding blocks may be obtained. Each of these partitions may be at one of various partitioning levels in the partitioning hierarchy, and may be of various shapes. Each of the partitions may be referred to as a coding block (CB). For the various example partitioning implementations described further below, each resulting CB may be of any of the allowed sizes and partitioning levels. Such partitions are referred to as coding blocks because they may form units for which some basic coding/decoding decisions may be made and coding/decoding parameters may be optimized, determined, and signaled in an encoded video bitstream. The highest or deepest level in the final partitions represents the depth of the coding block partitioning structure of tree. A coding block may be a luma coding block or a chroma coding block. The CB tree structure of each color may be referred to as coding block tree (CBT).

The coding blocks of all color channels may collectively be referred to as a coding unit (CU). The hierarchical structure of for all color channels may be collectively referred to as coding tree unit (CTU). The partitioning patterns or structures for the various color channels in in a CTU may or may not be the same.

In some implementations, partition tree schemes or structures used for the luma and chroma channels may not need to be the same. In other words, luma and chroma channels may have separate coding tree structures or patterns. Further, whether the luma and chroma channels use the same or different coding partition tree structures and the actual coding partition tree structures to be used may depend on whether the slice being coded is a P, B, or I slice. For example, For an I slice, the chroma channels and luma channel may have separate coding partition tree structures or coding partition tree structure modes, whereas for a P or B slice, the luma and chroma channels may share a same coding partition tree scheme. When separate coding partition tree structures or modes are applied, a luma channel may be partitioned into CBs by one coding partition tree structure, and a chroma channel may be partitioned into chroma CBs by another coding partition tree structure.

Figure 9:
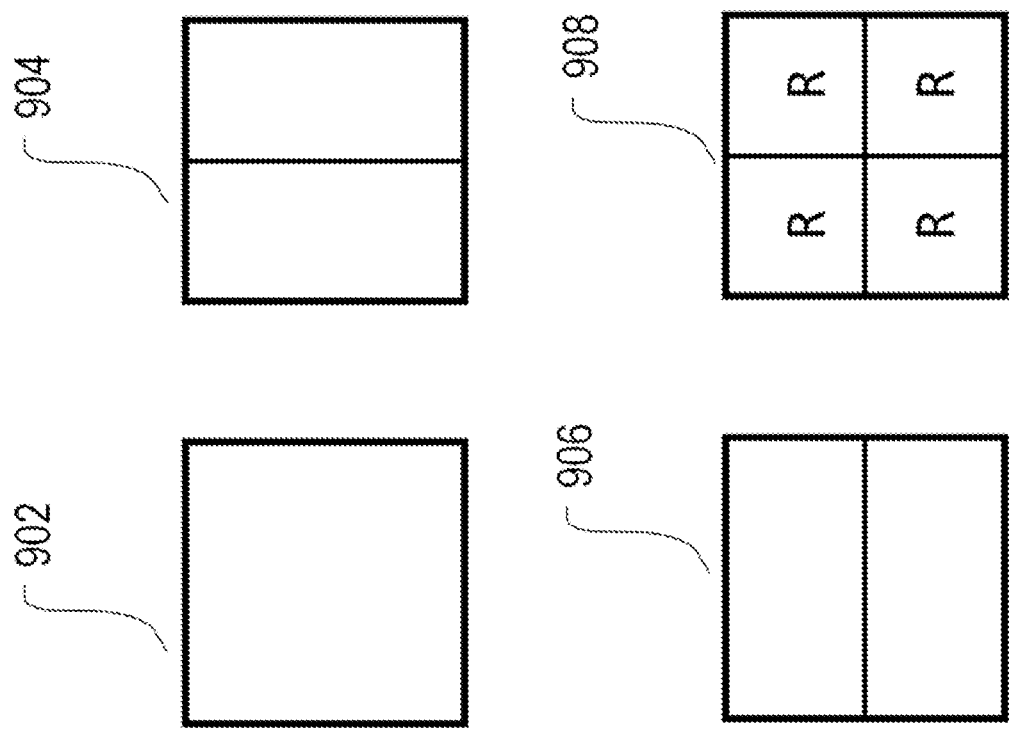
FIG. 9 shows a scheme of coding block partitioning according to example embodiments of the disclosure.

In some example implementations, a predetermined partitioning pattern may be applied to a base block. As shown in FIG. 9, an example 4-way partition tree may start from a first predefined level (e.g., 64×64 block level or other sizes, as a base block size) and a base block may be partitioned hierarchically down to a predefined lowest level (e.g., 4×4 level). For example, a base block may be subject to four predefined partitioning options or patterns indicated by 902, 904, 906, and 908, with the partitions designated as R being allowed for recursive partitioning in that the same partition options as indicated in FIG. 9 may be repeated at a lower scale until the lowest level (e.g., 4×4 level). In some implementations, additional restrictions may be applied to the partitioning scheme of FIG. 9. In the implementation of FIG. 9, rectangular partitions (e.g., 1:2/2:1 rectangular partitions) may be allowed but they may not be allowed to be recursive, whereas square partitions are allowed to be recursive. The partitioning following FIG. 9 with recursion, if needed, generates a final set of coding blocks. A coding tree depth may be further defined to indicate the splitting depth from the root node or root block. For example, the coding tree depth for the root node or root block, e.g. a 64×64 block, may be set to 0, and after the root block is further split once following FIG. 9, the coding tree depth is increased by 1. The maximum or deepest level from 64×64 base block to a minimum partition of 4×4 would be 4 (starting from level 0) for the scheme above. Such partitioning scheme may apply to one or more of the color channels. Each color channel may be partitioned independently following the scheme of FIG. 9 (e.g., partitioning pattern or option among the predefined patterns may be independently determined for each of the color channels at each hierarchical level). Alternatively, two or more of the color channels may share the same hierarchical pattern tree of FIG. 9 (e.g., the same partitioning pattern or option among the predefined patterns may be chosen for the two or more color channels at each hierarchical level).

Figure 10:
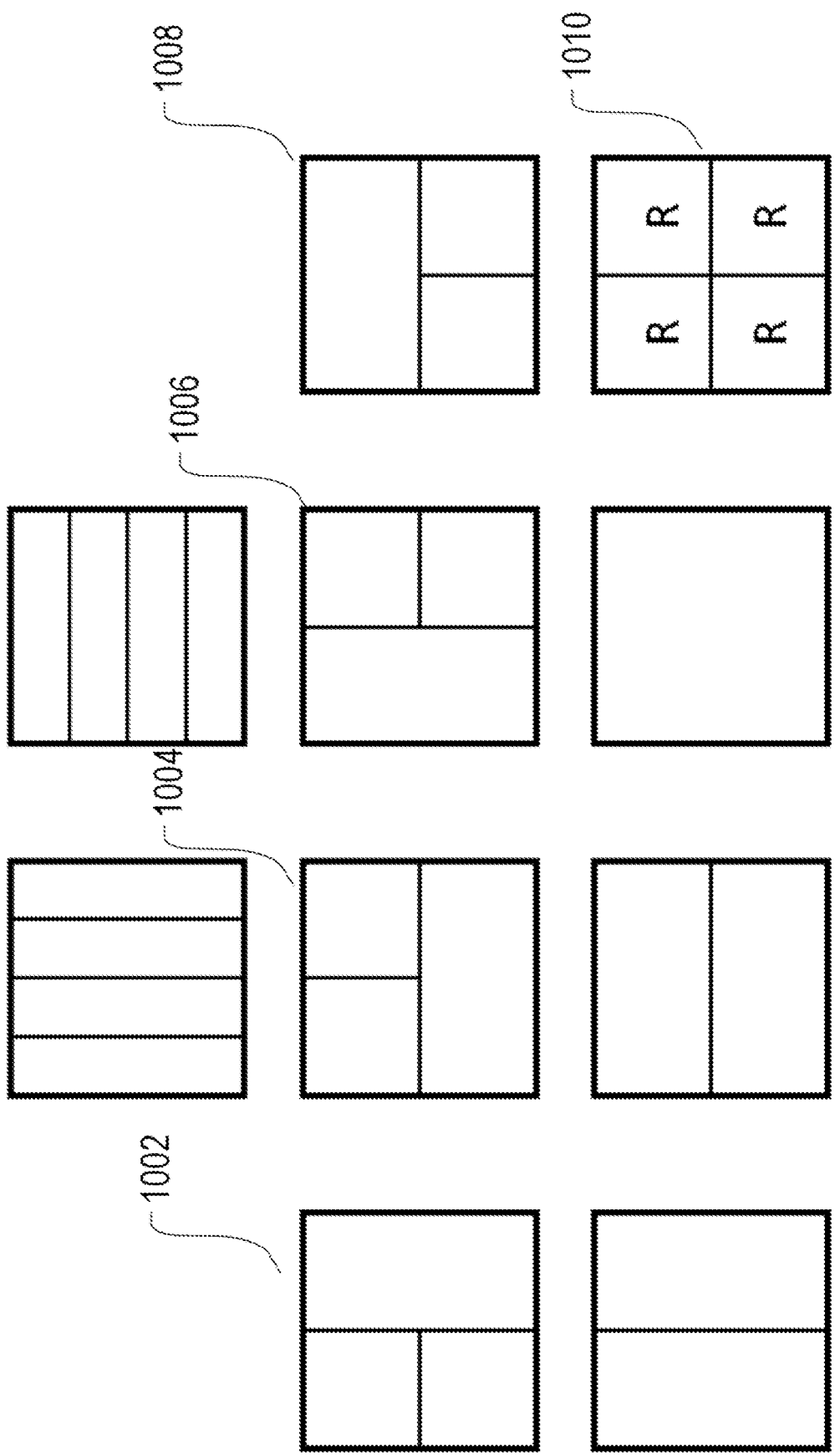
FIG. 10 shows another scheme of coding block partitioning according to example embodiments of the disclosure.

FIG. 10 shows another example predefined partitioning pattern allowing recursive partitioning to form a partitioning tree. As shown in FIG. 10, an example 10-way partitioning structure or pattern may be predefined. The root block may start at a predefined level (e.g. from a base block at 128×128 level, or 64×64 level). The example partitioning structure of FIG. 10 includes various 2:1/1:2 and 4:1/1:4 rectangular partitions. The partition types with 3 subpartitions indicated 1002, 1004, 1006, and 1008 in the second row of FIG. 10 may be referred to "T-type" partitions. The "T-Type" partitions 1002, 1004, 1006, and 1008 may be referred to as Left T-Type, Top T-Type, Right T-Type and Bottom T-Type. In some example implementations, none of the rectangular partitions of FIG. 10 is allowed to be further subdivided. A coding tree depth may be further defined to indicate the splitting depth from the root node or root block. For example, the coding tree depth for the root node or root block, e.g., a 128×128 block, may be set to 0, and after the root block is further split once following FIG. 10, the coding tree depth is increased by 1. In some implementations, only the all-square partitions in 1010 may be allowed for recursive partitioning into the next level of the partitioning tree following pattern of FIG. 10. In other words, recursive partitioning may not be allowed for the square partitions within the T-type patterns 1002, 1004, 1006, and 1008. The partitioning procedure following FIG. 10 with recursion, if needed, generates a final set of coding blocks. Such scheme may apply to one or more of the color channels. In some implementations, more flexibility may be added to the use of partitions below 8×8 level. For example, 2×2 chroma inter prediction may be used in certain cases.

In some other example implementations for coding block partitioning, a quadtree structure may be used for splitting a base block or an intermediate block into quadtree partitions. Such quadtree splitting may be applied hierarchically and recursively to any square shaped partitions. Whether a base block or an intermediate block or partition is further quadtree split may be adapted to various local characteristics of the base block or intermediate block/partition. Quadtree partitioning at picture boundaries may be further adapted. For example, implicit quadtree split may be performed at picture boundary so that a block will keep quadtree splitting until the size fits the picture boundary.

In some other example implementations, a hierarchical binary partitioning from a base block may be used. For such a scheme, the base block or an intermediate level block may be partitioned into two partitions. A binary partitioning may be either horizontal or vertical. For example, a horizontal binary partitioning may split a base block or intermediate block into equal right and left partitions. Likewise, a vertical binary partitioning may split a base block or intermediate block into equal upper and lower partitions. Such binary partitioning may be hierarchical and recursive. Decision may be made at each of the base block or intermediate block whether the binary partitioning scheme should continue, and if the scheme does continue further, whether a horizontal or vertical binary partitioning should be used. In some implementations, further partitioning may stop at a predefined lowest partition size (in either one or both dimensions). Alternatively, further partitioning may stop once a predefined partitioning level or depth from the base block is reached. In some implementations, the aspect ratio of a partition may be restricted. For example, the aspect ratio of a partition may not be smaller than 1:4 (or larger than 4:1). As such, a vertical strip partition with vertical to horizontal aspect ratio of 4:1, may only be further binary partitioned vertically into an upper and lower partitions each having a vertical to horizontal aspect ratio of 2:1.

Figure 13:
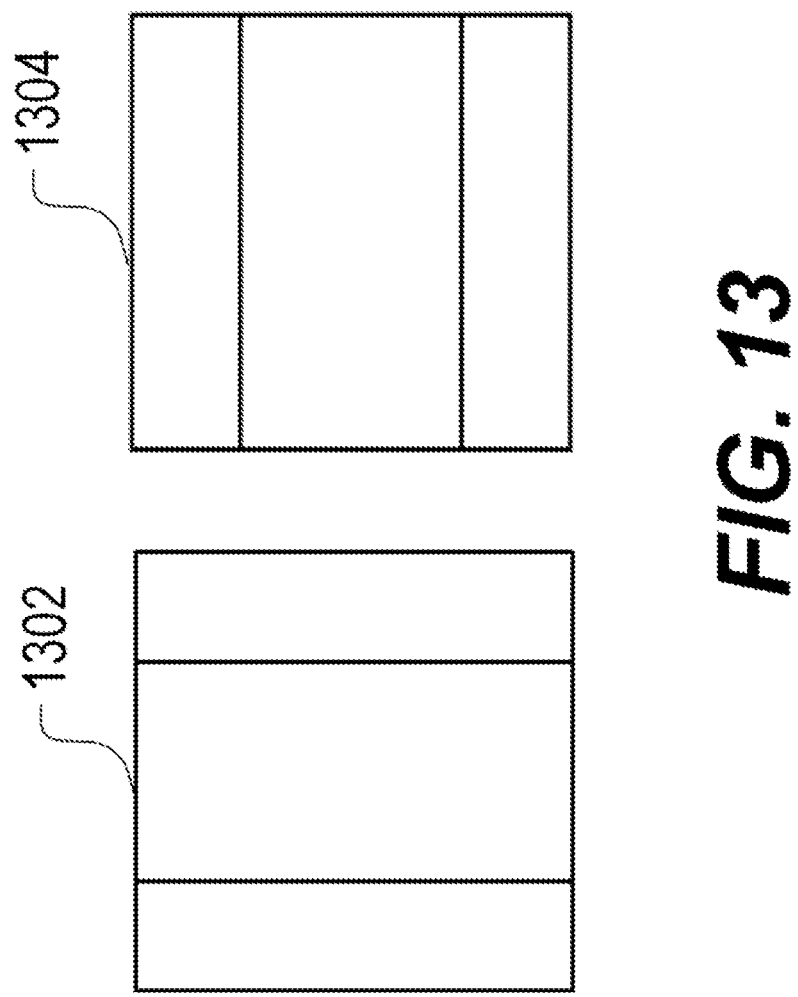
FIG. 13 shows an example ternary partitioning scheme.

In yet some other examples, a ternary partitioning scheme may be used for partitioning a base block or any intermediate block, as shown in FIG. 13. The ternary pattern may be implemented vertical, as shown in 1302 of FIG. 13, or horizontal, as shown in 1304 of FIG. 13. While the example split ratio in FIG. 13, either vertically or horizontally, is shown as 1:2:1, other ratios may be predefined. In some implementations, two or more different ratios may be predefined. Such ternary partitioning scheme may be used to complement the quadtree or binary partitioning structures in that such triple-tree partitioning is capable of capturing objects located in block center in one contiguous partition while quadtree and binary-tree are always splitting along block center and thus would split the object into separate partitions. In some implementations, the width and height of the partitions of the example triple trees are always power of 2 to avoid additional transforms.

Figure 14:
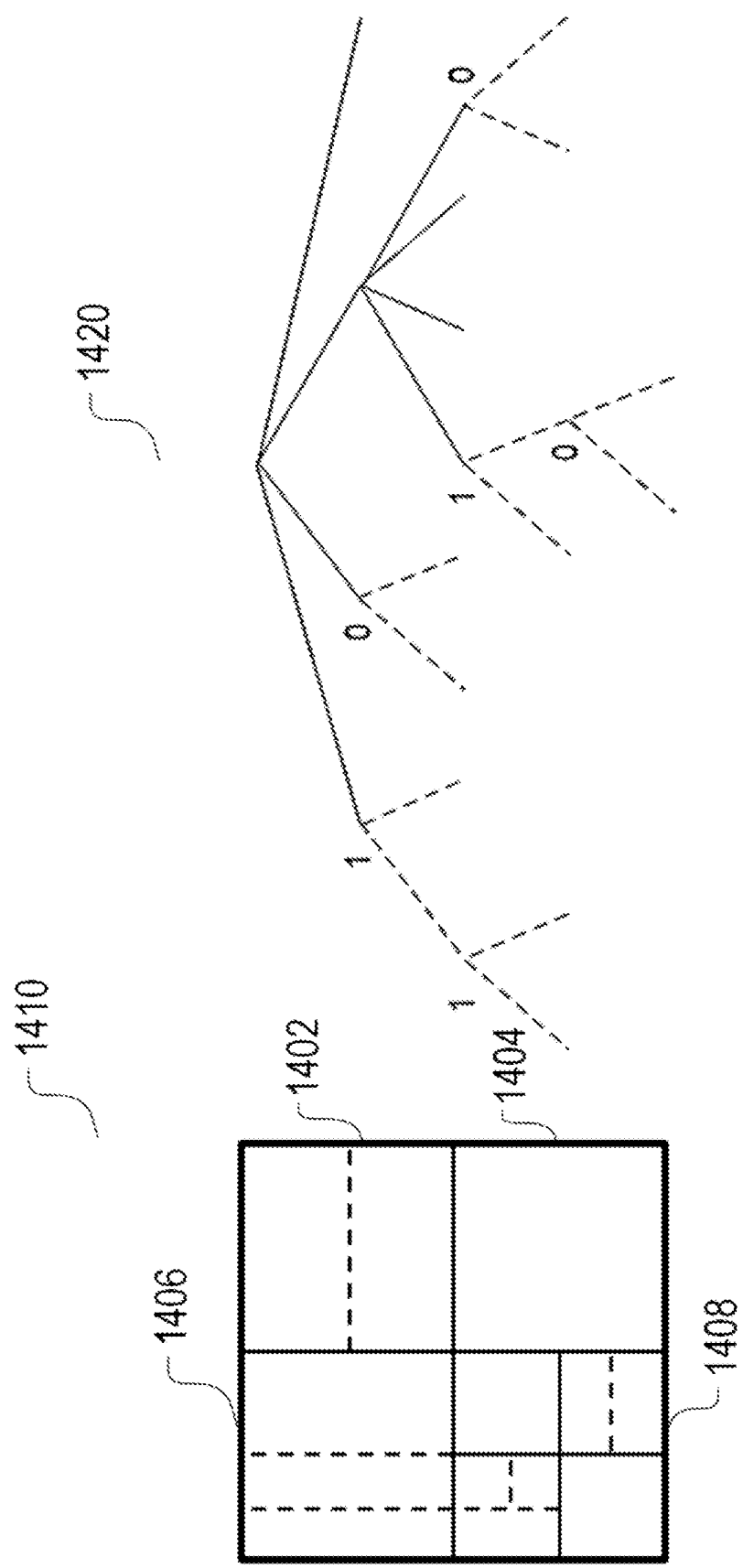
FIG. 14 shows an example quadtree binary tree coding block partitioning scheme.

The above partitioning schemes may be combined in any manner at different partitioning levels. As one example, the quadtree and the binary partitioning schemes described above may be combined to partition a base block into a quadtree-binary-tree (QTBT) structure. In such a scheme, a base block or an intermediate block/partition may be either quadtree split or binary split, subject to a set of predefined conditions, if specified. A particular example is illustrated in FIG. 14. In the example of FIG. 14, a base block is first quadtree split into four partitions, as shown by 1402, 1404, 1406, and 1408. Thereafter, each of the resulting partitions is either quadtree partitioned into four further partitions (such as 1408), or binarily split into two further partitions (either horizontally or vertically, such as 1402 or 1406, both being symmetric, for example) at the next level, or non-split (such as 1404). Binary or quadtree splitting may be allowed recursively for square shaped partitions, as shown by the overall example partition pattern of 1410 and the corresponding tree structure/representation in 1420, in which the solid lines represent quadtree splitting, and the dashed lines represent binary splitting. Flags may be used for each binary splitting node (non-leaf binary partitions) to indicate whether the binary splitting is horizontal or vertical. For example, as shown in 1420, consistent with the partitioning structure of 1410, flag "0" may represent horizontal binary splitting, and flag "1" may represent vertical binary splitting. For the quadtree-split partition, there is no need to indicate the splitting type since quadtree splitting always splits a block or a partition both horizontally and vertically to produce 4 sub-blocks/partitions with an equal size. In some implementations, flag "1" may represent horizontal binary splitting, and flag "0" may represent vertical binary splitting.

In some example implementations of the QTBT, the quadtree and binary splitting ruleset may be represented by the following predefined parameters and the corresponding functions associated therewith:
  CTU size: the root node size of a quadtree (size of a base block)
  MinQTSize: the minimum allowed quadtree leaf node size
  MaxBTSize: the maximum allowed binary tree root node size
  MaxBTDepth: the maximum allowed binary tree depth
  MinBTSize: the minimum allowed binary tree leaf node size
In some example implementations of the QTBT partitioning structure, the CTU size may be set as 128×128 luma samples with two corresponding 64×64 blocks of chroma samples (when an example chroma sub-sampling is considered and used), the MinQTSize may be set as 16×16, the MaxBTSize may be set as 64×64, the MinBTSize (for both width and height) may be set as 4×4, and the MaxBTDepth may be set as 4. The quadtree partitioning may be applied to the CTU first to generate quadtree leaf nodes. The quadtree leaf nodes may have a size from its minimum allowed size of 16×16 (i.e., the MinQTSize) to 128×128 (i.e., the CTU size). If a node is 128×128, it will not be first split by the binary tree since the size exceeds the MaxBTSize (i.e., 64×64). Otherwise, nodes which do not exceed MaxBTSize could be partitioned by the binary tree. In the example of FIG. 14, the base block is 128×128. The basic block can only be quadtree split, according to the predefined ruleset. The base block has a partitioning depth of 0. Each of the resulting four partitions are 64×64, not exceeding MaxBTSize, may be further quadtree or binary-tree split at level 1. The process continues. When the binary tree depth reaches MaxBTDepth (i.e., 4), no further splitting may be considered. When the binary tree node has width equal to MinBTSize (i.e., 4), no further horizontal splitting may be considered. Similarly, when the binary tree node has height equal to MinBTSize, no further vertical splitting is considered.

In some example implementations, the QTBT scheme above may be configured to support a flexibility for the luma and chroma to have the same QTBT structure or separate QTBT structures. For example, for P and B slices, the luma and chroma CTBs in one CTU may share the same QTBT structure. However, for I slices, the luma CTBs maybe partitioned into CBs by a QTBT structure, and the chroma CTBs may be partitioned into chroma CBs by another QTBT structure. This means that a CU may be used to refer to different color channels in an I slice, e.g., the I slice may consist of a coding block of the luma component or coding blocks of two chroma components, and a CU in a P or B slice may consist of coding blocks of all three colour components.

In some other implementations, the QTBT scheme may be supplemented with ternary scheme described above. Such implementations may be referred to as multi-type-tree (MTT) structure. For example, in addition to binary splitting of a node, one of the ternary partition patterns of FIG. 13 may be chosen. In some implementations, only square nodes may be subject to ternary splitting. An additional flag may be used to indicate whether a ternary partitioning is horizontal or vertical.

The design of two-level or multi-level tree such as the QTBT implementations and QTBT implementations supplemented by ternary splitting may be mainly motivated by complexity reduction. Theoretically, the complexity of traversing a tree is $T^D$, where T denotes the number of split types, and D is the depth of tree. A tradeoff may be made by using multiple types (T) while reducing the depth (D).

In some implementations, a CB may be further partitioned. For example, a CB may be further partitioned into multiple prediction blocks (PBs) for purposes of intra or inter-frame prediction during coding and decoding processes. In other words, a CB may be further divided into different subpartitions, where individual prediction decision/configuration may be made. In parallel, a CB may be further partitioned into a plurality of transform blocks (TBs) for purposes of delineating levels at which transform or inverse transform of video data is performed. The partitioning scheme of a CB into PBs and TBs may or may not be the same. For example, each partitioning scheme may be performed using its own procedure based on, for example, the various characteristics of the video data. The PB and TB partitioning schemes may be independent in some example implementations. The PB and TB partitioning schemes and boundaries may be correlated in some other example implementations. I some implementations, for example, TBs may be partitioned after PB partitions, and in particular, each PB, after being determined following partitioning of a coding block, may then be further partitioned into one or more TBs. For example, in some implementations, a PB may be split into one, two, four, or other number of TBs.

In some implementations, for partitioning of a base block into coding blocks and further into prediction blocks and/or transform blocks, the luma channel and the chroma channels may be treated differently. For example, in some implementations, partitioning of a coding block into prediction blocks and/or transform blocks may be allowed for the luma channel, whereas such partitioning of a coding block into prediction blocks and/or transform blocks may not be allowed for the chroma channel(s). In such implementations, transform and/or prediction of luma blocks thus may be performed only at the coding block level. For another example, minimum transform block size for luma channel and chroma channel(s) may be different, e.g., coding blocks for luma channel may be allowed to be partitioned into smaller transform and/or prediction blocks than the chroma channels. For yet another example, the maximum depth of partitioning of a coding block into transform blocks and/or prediction blocks may be different between the luma channel and the chroma channels, e.g., coding blocks for luma channel may be allowed to be partitioned into deeper transform and/or prediction blocks than the chroma channel(s). For a specific example, luma coding blocks may be partitioned into transform blocks of multiple sizes that can be represented by a recursive partition going down by up to 2 levels, and transform block shapes such as square, 2:1/1:2, and 4:1/1:4 and transform block size from 4×4 to 64×64 may be allowed. For chroma blocks, however, only the largest possible transform blocks specified for the luma blocks may be allowed.

In some example implementations for partitioning of a coding block into PBs, the depth, the shape, and/or other characteristics of the PB partitioning may depend on whether the PB is intra or inter coded.

The partitioning of a coding block (or a prediction block) into transform blocks may be implemented in various example schemes, including but not limited to quadtree splitting and predefined pattern splitting, recursively or non-recursively, and with additional consideration for transform blocks at the boundary of the coding block or prediction block. In general, the resulting transform blocks may be at different split levels, may not be of the same size, and may not need to be square in shape (e.g., they can be rectangular with some allowed sizes and aspect ratios). Further examples are descried in further detail below in relation to FIGS. 15, 16 and 17.

In some other implementations, however, the CBs obtained via any of the partitioning schemes above may be used as a basic or smallest coding block for prediction and/or transform. In other words, no further splitting is performed for perform inter-prediction/intra-prediction purposes and/or for transform purposes. For example, CBs obtained from the QTBT scheme above may be directly used as the units for performing predictions. Specifically, such a QTBT structure removes the concepts of multiple partition types, i.e. it removes the separation of the CU, PU and TU, and supports more flexibility for CU/CB partition shapes as described above. In such QTBT block structure, a CU/CB can have either a square or rectangular shape. The leaf nodes of such QTBT are used as units for prediction and transform processing without any further partitioning. This means that the CU, PU and TU have the same block size in such example QTBT coding block structure.

The various CB partitioning schemes above and the further partitioning of CBs into PBs and/or TBs (including no PB/TB partitioning) may be combined in any manner. The following particular implementations are provided as non-limiting examples.

A specific example implementation of coding block and transform block partitioning is described below. In such an example implementation, a base block may be split into coding blocks using recursive quadtree splitting, or a predefined splitting pattern described above (such as those in FIG. 9 and FIG. 10). At each level, whether further quadtree splitting of a particular partition should continue may be determined by local video data characteristics. The resulting CBs may be at various quadtree splitting levels, and of various sizes. The decision on whether to code a picture area using inter-picture (temporal) or intra-picture (spatial) prediction may be made at the CB level (or CU level, for all three-color channels). Each CB may be further split into one, two, four, or other number of PBs according to predefined PB splitting type. Inside one PB, the same prediction process may be applied and the relevant information may be transmitted to the decoder on a PB basis. After obtaining the residual block by applying the prediction process based on the PB splitting type, a CB can be partitioned into TBs according to another quadtree structure similar to the coding tree for the CB. In this particular implementation, a CB or a TB may but does not have to be limited to square shape. Further in this particular example, a PB may be square or rectangular shape for an inter-prediction and may only be square for intra-prediction. A coding block may be split into, e.g., four square-shaped TBs. Each TB may be further split recursively (using quadtree split) into smaller TBs, referred to as Residual Quadtree (RQT).

Figure 11:
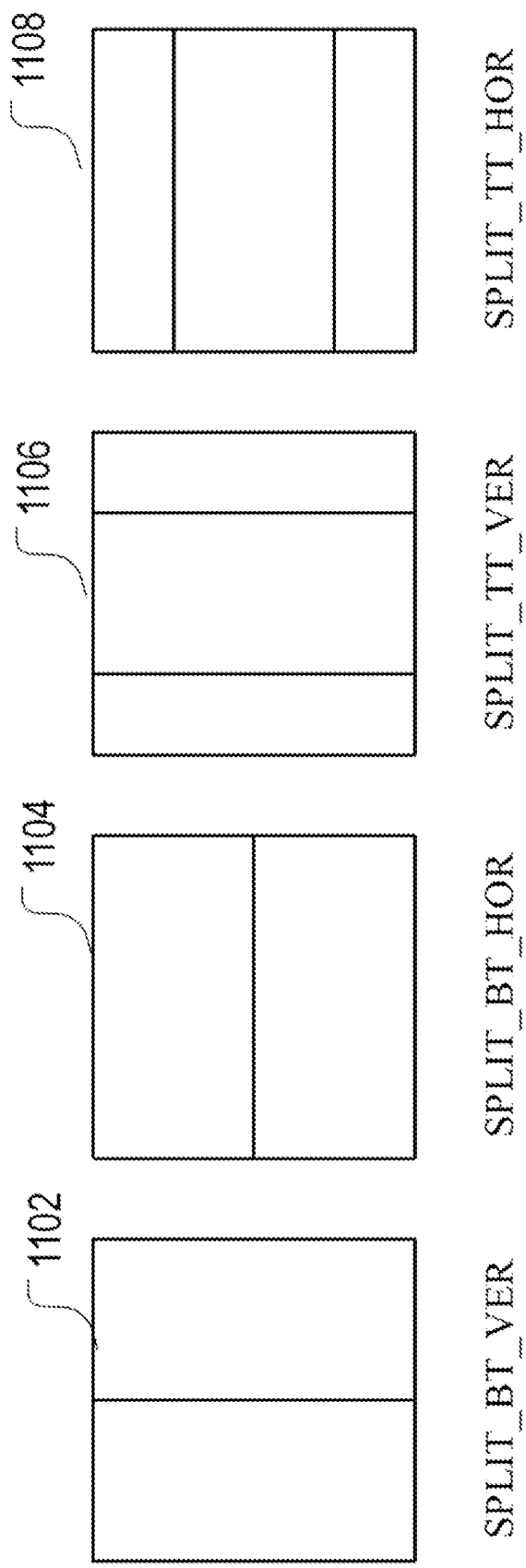
FIG. 11 shows another scheme of coding block partitioning according to example embodiments of the disclosure.

Another example implementation for partitioning of a base block into CBs, PBs and or TBs is further described below. For example, rather than using a multiple partition unit types such as those shown in FIG. 9 or FIG. 10, a quadtree with nested multi-type tree using binary and ternary splits segmentation structure (e.g., the QTBT or QTBT with ternary splitting as descried above) may be used. The separation of the CB, PB and TB (i.e., the partitioning of CB into PBs and/or TBs, and the partitioning of PBs into TBs) may be abandoned except when needed for CBs that have a size too large for the maximum transform length, where such CBs may need further splitting. This example partitioning scheme may be designed to support more flexibility for CB partition shapes so that the prediction and transform can both be performed on the CB level without further partitioning. In such a coding tree structure, a CB may have either a square or rectangular shape. Specifically, a coding tree block (CTB) may be first partitioned by a quadtree structure. Then the quadtree leaf nodes may be further partitioned by a nested multi-type tree structure. An example of the nested multi-type tree structure using binary or ternary splitting is shown in FIG. 11. Specifically, the example multi-type tree structure of FIG. 11 includes four splitting types, referred to as vertical binary splitting (SPLIT_BT_VER) (1102), horizontal binary splitting (SPLIT_BT_HOR) (1104), vertical ternary splitting (SPLIT_TT_VER) (1106), and horizontal ternary splitting (SPLIT_TT_HOR) (1108). The CBs then correspond to leaves of the multi-type tree. In this example implementation, unless the CB is too large for the maximum transform length, this segmentation is used for both prediction and transform processing without any further partitioning. This means that, in most cases, the CB, PB and TB have the same block size in the quadtree with nested multi-type tree coding block structure. The exception occurs when maximum supported transform length is smaller than the width or height of the colour component of the CB. In some implementations, in addition to the binary or ternary splitting, the nested patterns of FIG. 11 may further include quadtree splitting.

Figure 12:
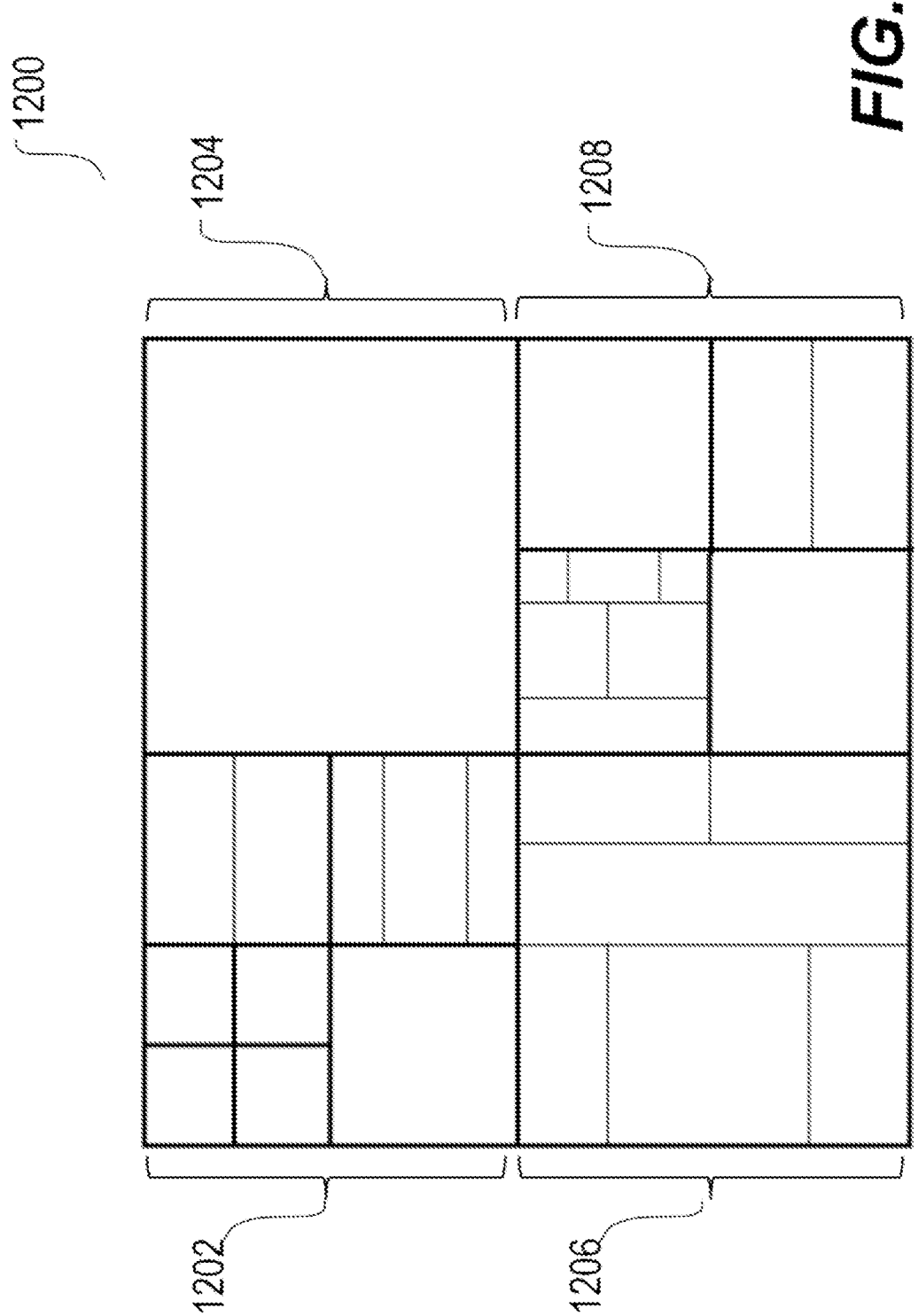
FIG. 12 shows an example partitioning of a base block into coding blocks according to an example partitioning scheme.

One specific example for the quadtree with nested multi-type tree coding block structure of block partition (including quadtree, binary, and ternary splitting options) for one base block is shown in FIG. 12. In more detail, FIG. 12 shows that the base block 1200 is quadtree split into four square partitions 1202, 1204, 1206, and 1208. Decision to further use the multi-type tree structure of FIG. 11 and quadtree for further splitting is made for each of the quadtree-split partitions. In the example of FIG. 12, partition 1204 is not further split. Partitions 1202 and 1208 each adopt another quadtree split. For partition 1202, the second level quadtree-split top-left, top-right, bottom-left, and bottom-right partitions adopts third level splitting of quadtree, horizontal binary splitting 1104 of FIG. 11, non-splitting, and horizontal ternary splitting 1108 of FIG. 11, respectively. Partition 1208 adopts another quadtree split, and the second level quadtree-split top-left, top-right, bottom-left, and bottom-right partitions adopts third level splitting of vertical ternary splitting 1106 of FIG. 11, non-splitting, non-splitting, and horizontal binary splitting 1104 of FIG. 11, respectively. Two of the subpartitions of the third-level top-left partition of 1208 are further split according to horizontal binary splitting 1104 and horizontal ternary splitting 1108 of FIG. 11, respectively. Partition 1206 adopts a second level split pattern following the vertical binary splitting 1102 of FIG. 11 into two partitions which are further split in a third-level according to horizontal ternary splitting 1108 and vertical binary splitting 1102 of the FIG. 11. A fourth level splitting is further applied to one of them according to horizontal binary splitting 1104 of FIG. 11.

For the specific example above, the maximum luma transform size may be 64×64 and the maximum supported chroma transform size could be different from the luma at, e.g., 32×32. Even though the example CBs above in FIG. 12 are generally not further split into smaller PBs and/or TBs, when the width or height of the luma coding block or chroma coding block is larger than the maximum transform width or height, the luma coding block or chroma coding block may be automatically split in the horizontal and/or vertical direction to meet the transform size restriction in that direction.

In the specific example for partitioning of a base block into CBs above, and as descried above, the coding tree scheme may support the ability for the luma and chroma to have a separate block tree structure. For example, for P and B slices, the luma and chroma CTBs in one CTU may share the same coding tree structure. For I slices, for example, the luma and chroma may have separate coding block tree structures. When separate block tree structures are applied, luma CTB may be partitioned into luma CBs by one coding tree structure, and the chroma CTBs are partitioned into chroma CBs by another coding tree structure. This means that a CU in an I slice may consist of a coding block of the luma component or coding blocks of two chroma components, and a CU in a P or B slice always consists of coding blocks of all three colour components unless the video is monochrome.

When a coding block is further partitioned into multiple transform blocks, the transform blocks therein may be order in the bitstream following various order or scanning manners. Example implementations for partitioning a coding block or prediction block into transform blocks, and a coding order of the transform blocks are described in further detail below. In some example implementations, as descried above, a transform partitioning may support transform blocks of multiple shapes, e.g., 1:1 (square), 1:2/2:1, and 1:4/4:1, with transform block sizes ranging from, e.g., 4×4 to 64×64. In some implementations, if the coding block is smaller than or equal to 64×64, the transform block partitioning may only apply to luma component, such that for chroma blocks, the transform block size is identical to the coding block size. Otherwise, if the coding block width or height is greater than 64, then both the luma and chroma coding blocks may be implicitly split into multiples of min (W, 64)×min (H, 64) and min (W, 32)×min (H, 32) transform blocks, respectively.

In some example implementations of transform block partitioning, for both intra and inter coded blocks, a coding block may be further partitioned into multiple transform blocks with a partitioning depth up to a predefined number of levels (e.g., 2 levels). The transform block partitioning depth and sizes may be related. For some example implementations, a mapping from the transform size of the current depth to the transform size of the next depth is shown in the following in Table 1.

TABLE 1

Transform partition size setting

| Transform Size of Current Depth | Transform Size of Next Depth |
|---|---|
| TX_4 × 4 | TX_4 × 4 |
| TX_8 × 8 | TX_4 × 4 |
| TX_16 × 16 | TX_8 × 8 |
| TX_32 × 32 | TX_16 × 16 |
| TX_64 × 64 | TX_32 × 32 |
| TX_4 × 8 | TX_4 × 4 |
| TX_8 × 4 | TX_4 × 4 |
| TX_8 × 16 | TX_8 × 8 |
| TX_16 × 8 | TX_8 × 8 |
| TX_16 × 32 | TX_16 × 16 |
| TX_32 × 16 | TX_16 × 16 |
| TX_32 × 64 | TX_32 × 32 |
| TX_64 × 32 | TX_32 × 32 |
| TX_4 × 16 | TX_4 × 8 |
| TX_16 × 4 | TX_8 × 4 |

TABLE 1-continued

Transform partition size setting

| Transform Size of Current Depth | Transform Size of Next Depth |
|---|---|
| TX_8 × 32 | TX_8 × 16 |
| TX_32 × 8 | TX_16 × 8 |
| TX_16 × 64 | TX_16 × 32 |
| TX_64 × 16 | TX_32 × 16 |

Based on the example mapping of Table 1, for 1:1 square block, the next level transform split may create four 1:1 square sub-transform blocks. Transform partition may stop, for example, at 4×4. As such, a transform size for a current depth of 4×4 corresponds to the same size of 4×4 for the next depth. In the example of Table 1, for 1:2/2:1 non-square block, the next level transform split may create two 1:1 square sub-transform blocks, whereas for 1:4/4:1 non-square block, the next level transform split may create two 1:2/2:1 sub transform blocks.

In some example implementations, for luma component of an intra coded block, additional restriction may be applied with respect to transform block partitioning. For example, for each level of transform partitioning, all the sub-transform blocks may be restricted to having equal size. For example, for a 32×16 coding block, level 1 transform split creates two 16×16 sub-transform blocks, level 2 transform split creates eight 8×8 sub-transform blocks. In other words, the second level splitting must be applied to all first level sub blocks to keep the transform units at equal sizes. An example of the transform block partitioning for intra coded square block following Table 1 is shown in FIG. 15, together with coding order illustrated by the arrows. Specifically, 1502 shows the square coding block. A first-level split into 4 equal sized transform blocks according to Table 1 is shown in 1504 with coding order indicated by the arrows. A second-level split of all of the first-level equal sized blocks into 16 equal sized transform blocks according to Table 1 is shown in 1506 with coding order indicated by the arrows.

In some example implementations, for luma component of inter coded block, the above restriction for intra coding may not be applied. For example, after the first level of transform splitting, any one of sub-transform block may be further split independently with one more level. The resulting transform blocks thus may or may not be of the same size. An example split of an inter coded block into transform locks with their coding order is show in FIG. 16. In the Example of FIG. 16, the inter coded block 1602 is split into transform blocks at two levels according to Table 1. At the first level, the inter coded block is split into four transform blocks of equal size. Then only one of the four transform blocks (not all of them) is further split into four sub-transform blocks, resulting in a total of 7 transform blocks having two different sizes, as shown by 1604. The example coding order of these 7 transform blocks is shown by the arrows in 1604 of FIG. 16.

In some example implementations, for chroma component(s), some additional restriction for transform blocks may apply. For example, for chroma component(s) the transform block size can be as large as the coding block size, but not smaller than a predefined size, e.g., 8×8.

In some other example implementations, for the coding block with either width (W) or height (H) being greater than 64, both the luma and chroma coding blocks may be implicitly split into multiples of min (W, 64)×min (H, 64) and min (W, 32)×min (H, 32) transform units, respectively.

Here, in the present disclosure, a "min (a, b)" may return a smaller value between a and b.

Figure 17:
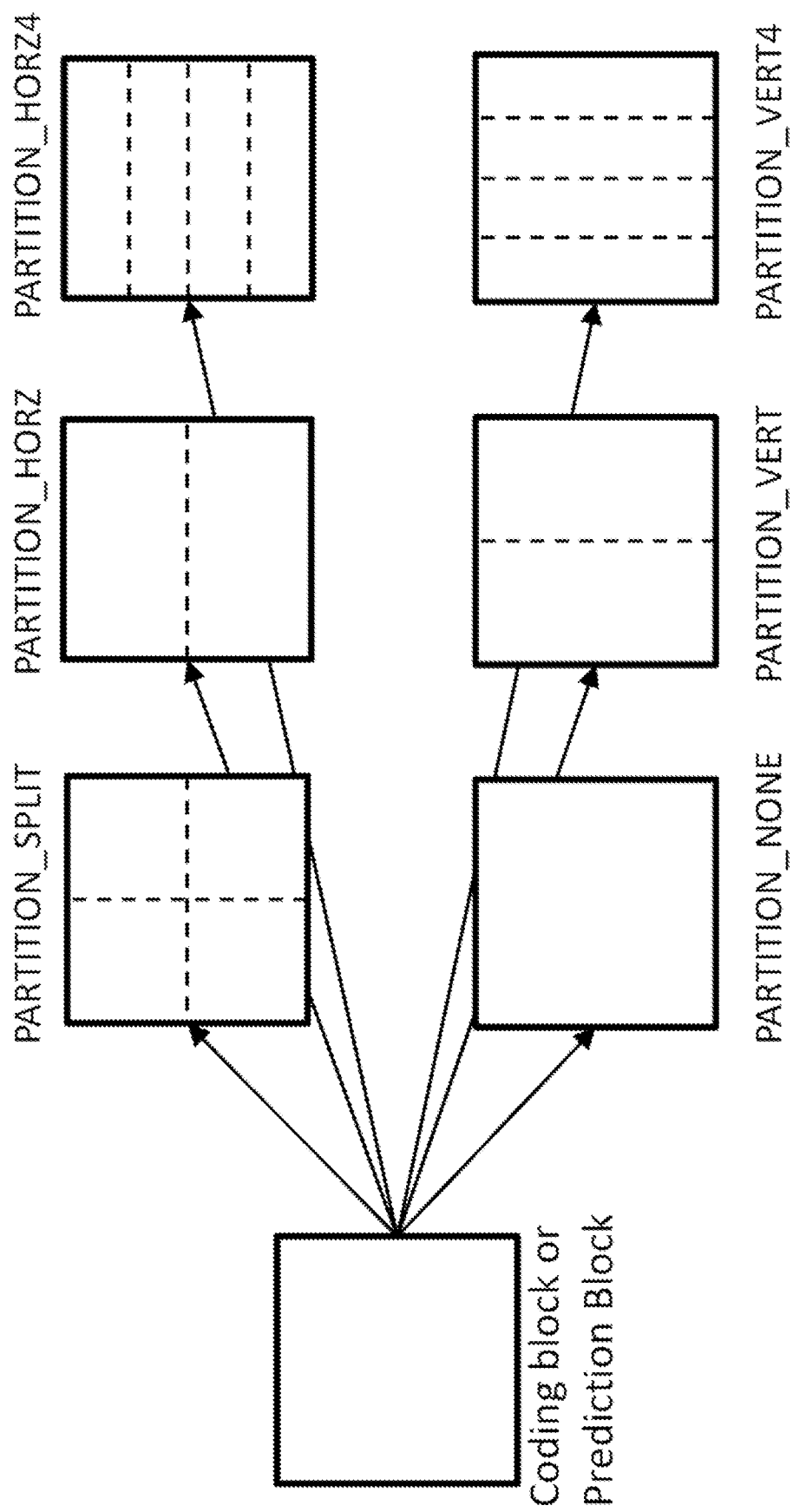
FIG. 17 shows another scheme for partitioning a coding block into multiple transform blocks according to example embodiments of the disclosure.

FIG. 17 further shows another alternative example scheme for partitioning a coding block or prediction block into transform blocks. As shown in FIG. 17, instead of using recursive transform partitioning, a predefined set of partitioning types may be applied to a coding block according a transform type of the coding block. In the particular example shown in FIG. 17, one of the 6 example partitioning types may be applied to split a coding block into various number of transform blocks. Such scheme of generating transform block partitioning may be applied to either a coding block or a prediction block.

In more detail, the partitioning scheme of FIG. 17 provides up to 6 example partition types for any given transform type (transform type refers to the type of, e.g., primary transform, such as ADST and others). In this scheme, every coding block or prediction block may be assigned a transform partition type based on, for example, a rate-distortion cost. In an example, the transform partition type assigned to the coding block or prediction block may be determined based on the transform type of the coding block or prediction block. A particular transform partition type may correspond to a transform block split size and pattern, as shown by the 6 transform partition types illustrated in FIG. 17. A correspondence relationship between various transform types and the various transform partition types may be predefined. An example is shown below with the capitalized labels indicating the transform partition types that may be assigned to the coding block or prediction block based on rate distortion cost:

PARTITION_NONE: Assigns a transform size that is equal to the block size.
PARTITION_SPLIT: Assigns a transform size that is ½ the width of the block size and ½ the height of the block size.
PARTITION_HORZ: Assigns a transform size with the same width as the block size and ½ the height of the block size.
PARTITION_VERT: Assigns a transform size with ½ the width of the block size and the same height as the block size.
PARTITION_HORZ4: Assigns a transform size with the same width as the block size and ¼ the height of the block size.
PARTITION_VERT4: Assigns a transform size with ¼ the width of the block size and the same height as the block size.

In the example above, the transform partition types as shown in FIG. 17 all contain uniform transform sizes for the partitioned transform blocks. This is a mere example rather than a limitation. In some other implementations, mixed transform blocks sizes may be used for the partitioned transform blocks in a particular partition type (or pattern).

A video block (a PB or a CB, also referred to as PB when not being further partitioned into multiple prediction blocks) may be predicted in various manners rather than being directly encoded, thereby utilizing various correlations and redundancies in the video data to improve compression efficiency. Correspondingly, such prediction may be performed in various modes. For example, a video block may be predicted via intra-prediction or inter-prediction. Particularly in an inter-prediction mode, a video block may be predicted by one or more other reference blocks or inter-predictor blocks from one or more other frames via either single-reference or compound-reference inter-prediction. For implementation of inter-prediction, a reference block may be specified by its frame identifier (temporal location of the reference block) and a motion vector indicating a spatial offset between the current block being encoded or decoded and the reference block (spatial location of the reference block). The reference frame identification and the motion vectors may be signaled in the bitstream. The motion vectors as spatial block offsets may be signaled directly, or may be itself predicted by another reference motion vector or predictor motion vector. For example, the current motion vector may be predicted by a reference motion vector (of e.g., a candidate neighboring block) directly or by a combination of reference motion vector and a motion vector difference (MVD) between the current motion vector and the reference motion vector. The latter may be referred to as merge mode with motion vector difference (MMVD). The reference motion vector may be identified in the bitstream as a pointer to, for example, a spatially neighboring block or a temporarily neighboring but spatially collocated block of the current block.

In some other example implementations, an intra-block copy (IBC) prediction may be employed. In IBC, a current block in the current frame may be predicted using another block in the current frame (rather than a temporally different frame, hence the term "intra") in combination of a block vector (BV) for indicating an offset of the location of the intra-predictor or reference block to that of the block being predicted. The location of the coding blocks may be represented by the pixel coordinates of, e.g., top-left corner relative to the top-left corner of the current frame (or slice). The IBC mode, thus use similar inter-prediction concept within a current frame. A BV, for example, may be predicted by other reference BVs directly or in combination of a BV difference between a current BV and the reference BV, amanous to predicting MV using reference MV and MV difference in inter-prediction. IBC is useful in providing improved coding efficiency particular for encoding and decoding video frames having screen content with, for example, significant number of repeating patterns such as textual information, where identical textual segments (letters, symbols, words, phases, etc.) appear in different parts of a same frame and can be employed to predict one another.

In some implementations, IBC may be treated as a separate prediction mode besides a normal intro-prediction mode and a normal inter-prediction mode. As such, a selection of prediction mode of a particular block may be made and signaled among three different prediction modes: intra-prediction, inter-prediction, and IBC modes. In these implementations, flexibility may be built in each of these modes to optimize coding efficiency in each of these modes. In some other implementations, the IBC may be treated as a submode or branch within the inter-prediction mode, using similar motion vector determination, referencing and coding mechanisms. In such implementations (integrated inter-prediction mode and IBC mode), the flexibility of the IBC may be somewhat restricted in order to harmonize the general inter-prediction mode and the IBC mode. However, such implementations are less complex while can still take advantage of IBC to improve coding efficiency for video frames characterized by, for example, screen content. In some example implementations, with existing pre-specified mechanisms for separate inter-prediction mode and intra-prediction mode, the inter-prediction mode may be extended to support IBC.

The selection of these prediction modes may be made at various levels, including but not limited to sequence level, frame level, picture level, slice level, CTU level, CT level, CU level, CB level, or PB level. For example, for IBC purposes, decision on whether IBC mode is adopted may be made and signaled at the CTU level. If a CTU is being signaled as adopting the IBC mode, then all coding blocks in the entire CTU may be predicted by IBC. In some other implementations, the IBC prediction may be determined at super block (SB, or superblock) level. Each SB may be slit into multiple CTUs or divisions in various manners (e.g., quadtree divisions). Examples are further provided below.

Figure 18:
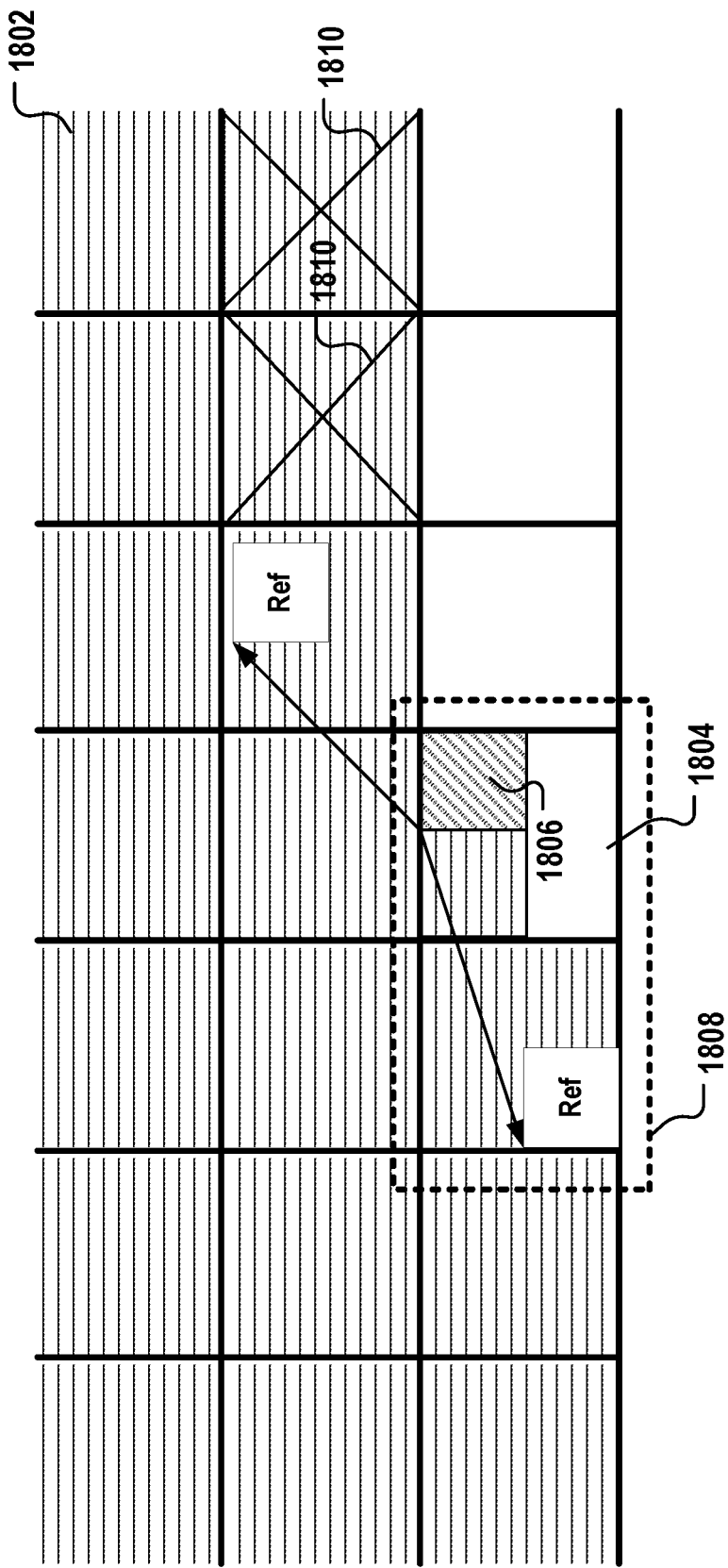
FIG. 18 illustrates concept of Intra Block Copy (IBC) using reconstructed coding block in a same frame to predict a current coding block.

FIG. 18 illustrates an example snapshot of a section of a current frame containing a plurality of CTUs from a decoder standpoint. Each square block such as 1802 represents a CTU. A CTU may be of one of various predefined sizes as described in detail above, such as a SB. Each CTU may include one or more coding blocks (or prediction blocks, for a particular color channel). The CTUs shaded with horizontal lines represents those CTUs that have already been reconstructed. CTU 1804 represents the current CTU being reconstructed. Within the current CTU 1804, the coding blocks shaded with horizontal lines represent the those blocks that have already been reconstructed in the current CTU, the coding block 1806 shaded with slanted lines is currently being reconstructed, whereas the unshaded coding blocks in the current CTU 1804 are waiting for reconstruction. Other unshaded CTUs are yet to be processed.

The location or offset of the reference block (relative to the current block) used for predicting the current coding block in IBC may be indicated by a BV, as shown by the example arrows in FIG. 18. For example, a BV may indicate the location difference in vector form between the upper left corners of the reference block (labeled as "Ref" in FIG. 18) and the current block. While FIG. 18 is illustrated using CTUs as the basic IBC units. The underlying principles apply to implementations where SBs are used as basic IBC units. In such implementations, as described in more detail below, each super block may be divided into multiple CTUs and each CTUs may be further divided into multiple coding blocks.

As further disclosed in more detail below, depending on a location of a reference CTU/SB relative to a current CTU/SB for IBC, the reference CTU/SB may be referred to as a local CTU/SB or non-local CTU/SB. A local CTU/SB may refer to a CTU/SB that coincides with the current CTU/SB or a CTU/SB that is near the current CTU/SB and has been reconstructed (e.g., a left neighboring CTU/SB of the current CTU/SB). A non-local CTU/SB may refer to a CTU/SB that is further away from the current CTU/SB. Either or both of the local CTU/SB and non-local CTU/SB may be searched for reference blocks when performing IBC prediction of a current coding block. Specific manners in which the IBC is implemented may depend on whether the reference CTU/SB is local or non-local, as on-chip and off-chip storage management of reconstructed samples (such as off-chip picture buffer (DPB) and/or on-chip memory) for local or non-local CTU/SB referencing may differ. Reconstructed local CTU/SBs samples, for example, may be suitable for storage in an on-chip memory of an encoder or decoder for IBC. Reconstructed non-local CTU/SBs samples, for example, may be stored in off-chip DPB memory, or external memory.

In some implementations, the location of reconstructed blocks that may be used as reference blocks for the current coding block 1804 may be restricted. Such restrictions may be a result of various factors and may depend on whether the IBC is implemented as an integrated part of the general inter-prediction mode, a special extension of the inter-prediction mode, or a separate and independent IBC mode. In some examples, only the current reconstructed CTU/SB samples may be searched for identify IBC reference block. In some other examples, the current reconstructed CTU/SB samples and another neighbor reconstructed CTU/SB samples (e.g., the left neighboring CTU/SB) may be available for reference block search and selection, as shown by the thick dotted frame 1808 of FIG. 18. For such implementations, only local reconstructed CTU/SB samples may be used for IBC reference block search and selection. In some other examples, certain CTU/SB may not be available for IBC reference block search and selection for various other reasons. For example, the CTU/SBs 1810 marked with crosses in FIG. 18 at may not be available for search and selection of reference blocks for the current block 1804, as they may be used for special purposes (e.g., wave front parallel processing) as described further below.

In some implementations, as shown in FIG. 18, an area formed by the thick dotted frame 1808 may be referred to as a local search area. Samples in the local search area may be stored in on-chip memory.

In some implementations, when IntraBC is allowed, the loop filters are disabled, which includes Deblocking filter, Constrained. Directional Enhancement Filter (CDEF), and the Loop Restoration (LR). By doing this, a second picture buffer dedicated for enabling/supporting IntraBC may be avoided.

Figures 19, 20:
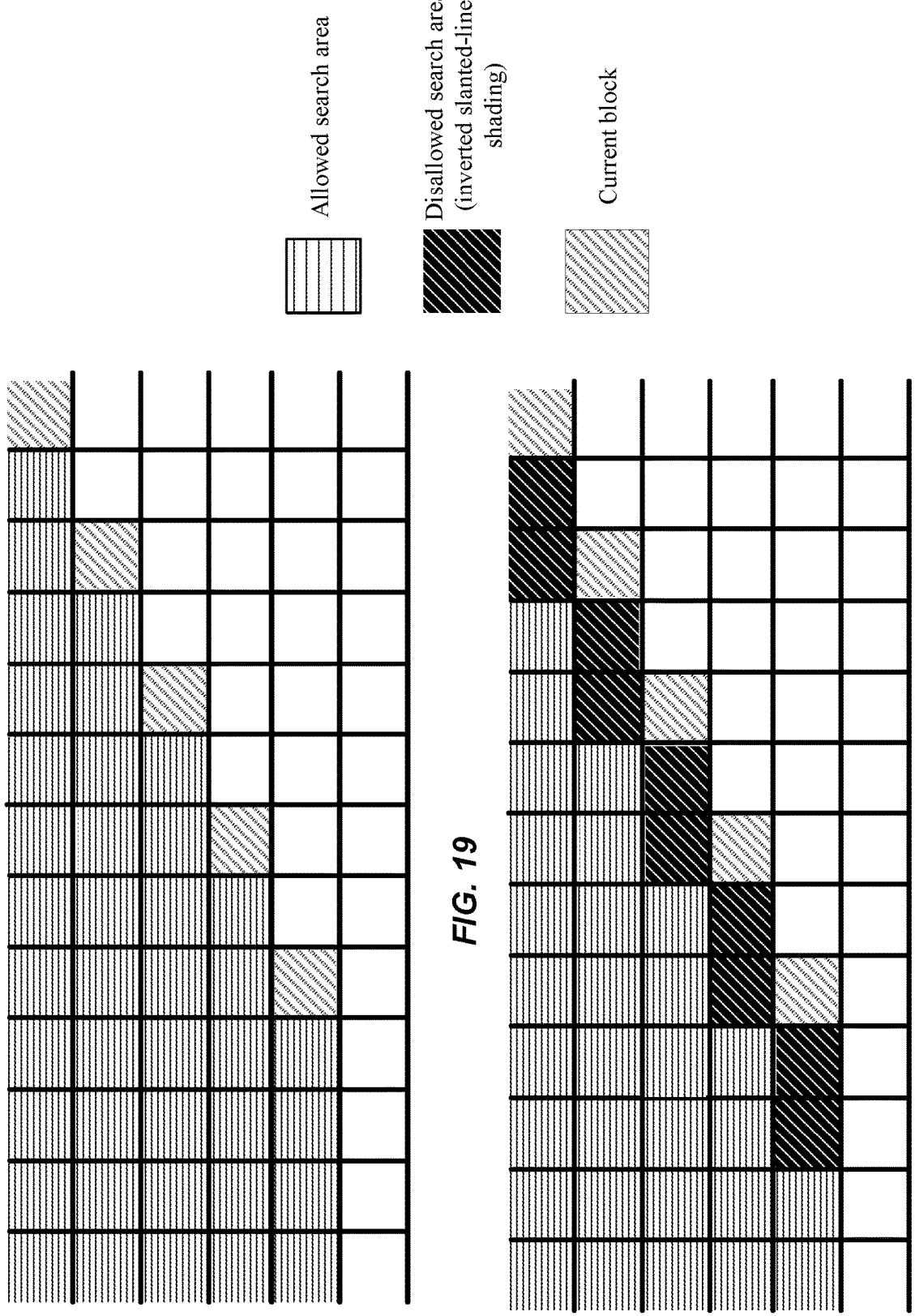
FIG. 19 illustrates example reconstructed sample that are available as reference samples for IBC.
FIG. 20 illustrates example reconstructed sample that are available as reference samples for IBC with some example restrictions.

In some implementations, restrictions as to the already-reconstructed CTU/SBs that are allowed to be used to provide IBC reference blocks or reference samples may result from adoption of parallel decoding, where more than one coding blocks are being decoded simultaneously. An example is shown in FIG. 19, where each square represents a CTU/SB. Parallel decoding may be implemented, in which a plurality of CTU/SBs in a number of consecutive rows and every other column (every two columns) may be reconstructed in parallel processing, as shown by the CTU/SBs shaded with slanted lines in FIG. 19. Other CTU/SBs shaded with horizontal lines have already been reconstructed, and the unshaded CTU/SBs are the ones that are yet to be constructed. With such parallel processing, for a currently parallel processed CTU/SB having its top-left coordinate being $(x_0, y_0)$, reconstructed samples at $(x, y)$ can be accessed for predicting the current CTU/SB in IBC only if the vertical coordinate y is less than $y_0$ and horizontal coordinate x is less $x_0+2(y_0-y)$, as such, the already constructed CTU/SB shaded with horizontal line may be available as reference for the parallelly processed current blocks. Note that the unit of the coordinate, such as $(x_0, y_0)$, and $(x, y)$, may include pixel, block (e.g., an SB), and the like.

In some implementations, write-back delay of immediately reconstructed samples into off-chip DPB may place further restrictions on the CTU/SBs that may be used to provide IBC reference samples for a current block, particularly when off-chip DPB is used for holding IBC reference samples. An example is shown in FIG. 20, where additional restrictions may be applied on top of those shown FIG. 19. Specifically, to allow hardware writing back delay, immediate reconstructed areas may not be accessed by IBC prediction for search and selection of reference blocks. The number of restricted or prohibited immediate reconstructed areas can be 1 n CTU/SBs, where n is a positive number and n may be positively correlated to the duration of the writing back delay. As such, on top of the particular parallel processing restriction of FIG. 19, for a current CTU/SB's (shaded with slanted lines) if the coordinate of one current CTU/SB's top-left position is $(x_0, y_0)$, the prediction at position $(x, y)$ can be accessed by IBC, if vertical coordinate y is less than $y_0$ and horizontal coordinate is less than $x_0+2(y_0-y)-D$, where D denotes the number of immediate reconstructed area (e.g., to the left of the current CTU/SB) that are restricted/prohibited for use as IBC reference. FIG. 20 illustrates such additional CTU/SBs that are restricted out as IBC reference samples for D=2 (in the unit of block, or 2×128 pixels, in the unit of pixel when each block is a 128×128 SB). These additional CTU/SBs that are not available as IBC reference are indicated by the inverted slanted-line shading.

In some implementations, as shown in FIG. 20, an area formed by blocks shaded with horizontal lines may be referred to as non-local search area, and samples in this area may be stored in external memory.

In some implementations, also described in further detail below, both the local and non-local CTU/SBs search areas may be used for IBC reference block search and selection. In addition, when on-chip memory is used, some of the restrictions as to availability of an already-constructed CTU/SB as IBC reference with respect to write back delays may be relaxed or removed. In some further implementations, the manner in which the local CTU/SBs and non-local CTU/SBs are used, when in co-existence, may differ, due to difference in, for example, management of buffering of the reference blocks using either on-chip or off-chip memories. These implementations are described in further detail in the disclosure below.

In some implementations, IBC may be implemented as an extension of inter-prediction mode, treating a current frame as a reference frame in inter-prediction mode such that blocks within the current frame may be used as prediction reference. Such IBC implementations thus may follow a coding path for inter prediction, even althought the IBC process only involves the current frame. In such an implementation, the referencing structure of inter-prediction mode may be adapted for IBC, where the representation of the addressing mechanism to the reference samples using BVs can be analogous to motion vectors (MVs) in inter-prediction. As such, IBC may be implemented as a special inter prediction mode, relying on similar or identical syntax structure and decoding processes as inter-prediction mode based on the current frame as a reference frame.

In such implementations, as IBC may be treated as an inter-prediction mode, an intra-only predicted slice has to become a predicted slice for allowing the usage of IBC. In other words, an intra-only prediction slice would not be inter-predicted (as intra prediction mode would not invoke any inter-prediction processing path) and thus IBC would not be allowed for prediction in such intra-only slice. When IBC is applicable, the coder would extend the reference picture lists by one entry for the pointer to the current picture. The current picture thus may take up to one picture-sized buffer of the shared decoded picture buffer (DPB). The signaling for use of IBC may be implicit in the choice of reference frame in the inter-prediction mode. For example, when the selected reference picture points to the current picture, the coding unit would employ IBC with inter-prediction-like coding path with special IBC extensions if needed and available. In some specific implementations, reference samples within the IBC process may not be loop filtered before being used for prediction, in contrast to regular inter prediction. Further, the corresponding reference current picture may be a long-term reference frame as it would be near next frames to be encoded or decoded. In some implementations, to minimize the memory requirement, the coder may immediately release the buffer after reconstructing the current picture. The coder may fill a filtered version of the reconstructed picture back into the DPB as a short-term reference when it becomes reference picture for later frames in true inter-prediction, even though it may be unfiltered when being used for the IBC.

In the example implementations above, even though the IBC may be a mere extension of the inter-prediction mode, the IBC may be treated with several special procedures that may depart from normal inter-prediction. For example, the IBC reference samples, again, may be unfiltered. In other words, the reconstructed samples before the in-loop filtering processes, including deblocking filtering (DBF), Sample Adaptive Offset (SAO) filtering, Cross-Component Sample Offset (CCSO) filtering, and the like, may be used for IBC prediction, whereas the normal inter prediction mode employ filtered samples for prediction. For another example, no luma sample interpolation for IBC may not be performed, and chroma sample interpolation may only be necessary when the chroma BV is a non-integer when derived from the luma BV. For yet another example, when the chroma BV is non-integer, and the reference block for IBC is near the boundary of an available region for IBC reference, the surrounding reconstructed samples may be outside of the boundary to perform chroma interpolation. BVs pointing to a single next-to-border line are not possible to avoid such cases.

In such implementations, prediction of a current block by IBC may reuse the prediction and coding mechanism of the inter-prediction process, including using a reference BV to predict a current BV and, for example, an additional BV difference. In some specific implementations, however, luma BVs may be implemented in integer resolution rather than fractional precision as in MV for regular inter prediction.

In some implementations, all CTUs and SBs indicated with horizontal shading lines in FIG. 18 may be used for search and selection of IBC reference block except for the two CTUs on the right and above the current CTU (indicated by the crosses in FIG. 18) for allowing Wavefront Parallel Processing (WPP), shown as 1810 in FIG. 18. As such, almost the whole already reconstructed area of the current picture, with some exceptions for parallel processing purposes.

In some other implementations, the areas from which IBC reference blocks may be searched and selected may be restricted to local CTU/SBs. One example is indicated by the thick dotted frame 1808 of FIG. 18. In such an example, the CTU/SB to the left of the current CTU may serve as the reference sample area for IBC at the beginning of the current CTU's reconstruction process. When using such local reference areas, instead of allocating additional external memory space in the DPB, on-chip memory space may be allocated for keeping the local CTU/SB for IBC reference. In some implementations, a fixed on-chip memory may be used for IBC, thereby reducing a complexity of implementing IBC in hardware architectures. As such, a dedicated IBC mode independent of normal inter-prediction may be implemented for utilization of on-chip memory, rather than being implemented as a mere extension of the inter-prediction mode.

For example, the fixed on-chip memory size for storing local IBC reference samples, e.g., the left CTU or SB, may be 128×128 for each color component. In some implementations, a maximum CTU size may also be 128×128. In such cases, the reference sample memory (RSM) can hold samples with a size of a single CTU. In some other alternative implementations, the CTU size may be less. For example, the CTU size may be 64×64. As such, the RSM may hold multiple (4, in this example case) CTUs simultaneously. In yet some other implementations, the RSM may hold multiple SBs, each SB may include one or more CTUs, and each CTUs may include multiple coding blocks.

In some implementations of local on-chip IBC referencing, the on-chip RSM hold one CTU and may implement a continuous update mechanism for replacing the reconstructed samples of the left neighboring CTU with the reconstructed samples of the current CTU. FIG. 21 illustrates a simplified example for the such continuous RSM update mechanism at four intermediate times during the reconstruction process. In the example of FIG. 21, the RSM has a fixed size that holds one CTU. The CTU may include an implicit division. For example, the CTU may be implicitly divided into four disjoining areas (e.g., quadtree division). Each area may include multiple coding blocks. The CTU may be 128×128 in size, whereas each of the example areas or divisions may be 64×64 in size for the example quadtree division. The areas/divisions of the RSM shaded with horizontal lines in each of the intermediate times hold corresponding reconstructed reference samples of the left-neighboring CTU, and the areas/divisions shaded with vertical lines gray holds corresponding reconstructed reference samples of the current CTU. The coding block of the RSM shaded with slanted lines represents the current coding block within the current area being coded/decoded/reconstructed.

At the first intermediate time, representing the beginning of the current CTU reconstruction, the RSM may include reconstructed reference samples of the left neighboring CTU only for each of the four example areas, as shown by 2102. In the other three intermediate times, the reconstruction process has gradually replaced reconstructed reference samples of the left neighboring CTU with the current CTU's reconstructed samples. A reset of an area/division of 64×64 in the RSM occurs when the coder processes the first coding block of that area/division. At the time of resetting an area of the RSM, that area is considered blank and is considered not holding any reconstructed reference samples for IBC (in other words, that area of RSM is not ready for use as IBC reference samples). As the corresponding current coding blocks in that area are processed, the corresponding blocks in the RSM are filed with reconstructed samples of the corresponding blocks of the current CTU to be used as reference samples for IBC for next current blocks, as shown in FIG. 21 for intermediate times 2104, 2106, and 2108. Once all coding blocks are processed corresponding to an area/division of the RSM, that entire area is filled with reconstructed samples of these current coding blocks as IBC reference samples, as shown by the areas fully shaded with vertical lines in FIG. 21 at various intermediate times. As such, in intermediate times 2104 and 2106, some areas/divisions in the RSM hold IBC reference samples from neighboring CTU, some other areas/divisions entirely hold reference samples from the current CTU, whereas some areas/divisions partially hold reference samples from the current CTU and partially blank (not used for IBC reference as a result of the reset process described above). As the final area (e.g., the bottom-right area) is being processed, all other three areas would hold reconstructed samples of the current CTU as reference samples for IBC whereas the last area/division partially holds reconstructed samples of corresponding coding blocks in the current CTU and is partially blank, until the final coding block of the CTU is reconstructed, at which time the entire RSM hold the reconstructed samples of the current CTU and the RSM is ready for use for the next CTU if also coded in IBC mode.

FIG. 22 illustrates the above continuous update implementation of the RSM spatially at a particularly intermediate time, i.e., the left neighboring CTU and the current CTU with the current coding block (the block shaded by slanted shading lines) are both shown. The corresponding reconstructed samples for these two CTUs that are in the RSM and are effective as IBC reference samples for the current coding block are shown by the horizontal and vertical shading lines. At the particular reconstruction time in this example, the processing has replaced, in the RSM, the samples covered by the unshaded area in the left neighboring CTU with the areas of the current CTU shaded by vertical shading lines. The remaining effect samples from the neighboring CTU is shown as horizontal-line shading.

In the example implementation above, the RSM is implemented to contain one CTU when the fixed RSM size is the same as the CTU size. In some other implementations, where CTU size is smaller, the RSM may contain more than a single CTU. For example, the size of a CTU may be 32×32 whereas the fixed RSM size may be 128×128. As such, the RSM may hold samples of 16 CTUs. Following the same underlying RSM updating principles described above, the RSM may hold 16 neighboring CTUs of a current 128×128 patch prior to being reconstructed. As soon as the processing of the first coding block of the current 128×128 patch commences, the first 32×32 region of the RSM initially filled with reconstructed samples of one neighboring CTU may updated as described above for an RSM holding a single CTU. The remaining fifteen 32×32 regions contain 15 neighboring CTUs as reference samples for IBC. Once the CTU corresponding to the first 32×32 region of the current 128×128 patch being decoded is reconstructed, the first 32×32 region of the RSM is updated with the reconstructed samples of this CTU. Then the CTU corresponding to the second 32×32 region of the current 128×128 patch may be processed and eventually updated with the reconstructed samples. This process continues until the sixteen 32×32 regions of the RSM contain reconstructed samples of the current 128×128 patch (all 15 CTUs). The decoding process then move on to the next 128×128 patch.

In some other implementations, as an expansion of FIG. 21 ad 22, the RSM may hold a set of neighboring CTUs. One current CTU is processed at a time, the RSM portion holding the furthest neighboring CTU is updated in the manner described above with the reconstructed current CTU. For the next current CTU, again, the furthest neighbor CTU in the RSM is updated and replaced. As such, the multiple CTUs held in the fixed size RSM update as a moving window of neighboring CTUs for IBS.

Figure 23:
FIG. 23 illustrates another example on-chip Reference Sample Memory (RSM) updating mechanism for IBC.

A further specific example implementation of local IBC using on-chip RSM is shown in FIG. 23. In this example, the largest block size for IBC mode may be limited. For example, the largest IBC block may be 64×64. The on-chip RSM may be configured with a fixed size, e.g., 128×128, corresponding to a superblock (SB). The RSM implementation of FIG. 23 use similar underlying principle of the implementation of FIG. 21 and FIG. 22. In FIG. 23, the RSM may hold multiple neighboring and/or current CTU as IBC reference samples. In the example of FIG. 23, the SB may be quadtree split. Correspondingly, the RSM may be quadtree split in 4 regions or units each being 64×64. Each of these areas may hold one or more coding blocks. Alternatively, each of these areas may hold one or more CTUs and each CTUs may hold one or more coding blocks. The coding order of the quadtree areas may be predefined. For example, the coding order may be top-left, top-right, bottom left, to bottom right. The quadtree splitting of the SB of FIG. 23 is merely one example. In some other alternative implementations, SB may be split following any other scheme. The RSM updating implementations for local IBC described herein applies to those alternative splitting schemes.

In such local IBC implementations, the local reference blocks that may be used for IBC prediction may be limited. For example, it may be required that the reference block and the current block should be in the same SB row. Specifically, the local reference block may only be located in the current SB or one SB on the left to the current SB. Example current blocks as being predicted in IBC by another allowed coding block are shown by the dashed arrows in FIG. 23. When the current SB or the left SB are used for IBC reference, the reference sample updating procedure in the RSM may follow the reset procedure described above. For example, when any of the 64×64 unit reference sample memory begins to update with the reconstructed samples from the current SB, the previous stored reference samples (from the left SB) in the whole 64×64 unit are marked as unavailable for generating IBC prediction samples and it is gradually updated with reconstructed samples of the current blocks.

FIG. 23 shows 5 example states of the RSM during local IBC decoding of a current SB in panel 2302. Again, the areas of the RSM shaded with horizontal lines in each of the example states hold corresponding reference samples of the corresponding quadtree area of the left-neighboring SB, and the areas/divisions shaded with vertical lines gray holds corresponding reference samples of the current SB. The coding block of the RSM shaded with slanted lines represents the current coding block within the current quadtree area being coded/decoded. At the beginning of coding of each current SB, the RSM stores samples of the previous coded SB (RSM state (0) of FIG. 23). When the current block is located in one of the four 64×64 quadtree areas in the current SB, the corresponding region in the RSM is reset and used to store the samples of current 64×64 coding region. In this way, the samples in each 64×64 quadtree area of the RSM are gradually updated by the samples in the current SB (state (1)-state (3)). When the current SB has been coded completely, the entire RSM is filled with all the samples of the current SB (state (4)).

Each of the 64×64 area in panel 2302 of FIG. 23 is labeled with a spatial coding sequence number. Sequence 0-3 represents the four 64×64 quadtree areas of the left neighbor SB, whereas sequence 4-7 represents the four 64×64 quadtree areas of the current SB Panel. In FIG. 23, panel 2304 further illustrates the corresponding spatial distribution in the left neighboring and current SBs of the reference samples in the 128×28 RSM, for RSM state (1), state (2), and state (3) of panel 2302 of FIG. 23. The shaded areas without crosses represents areas with reconstructed samples in the RSM. The shaded areas with crosses represent areas with reconstructed samples of the left SB in the RSM being reset (and thus unavailable as reference samples for local IBC).

Figure 24:
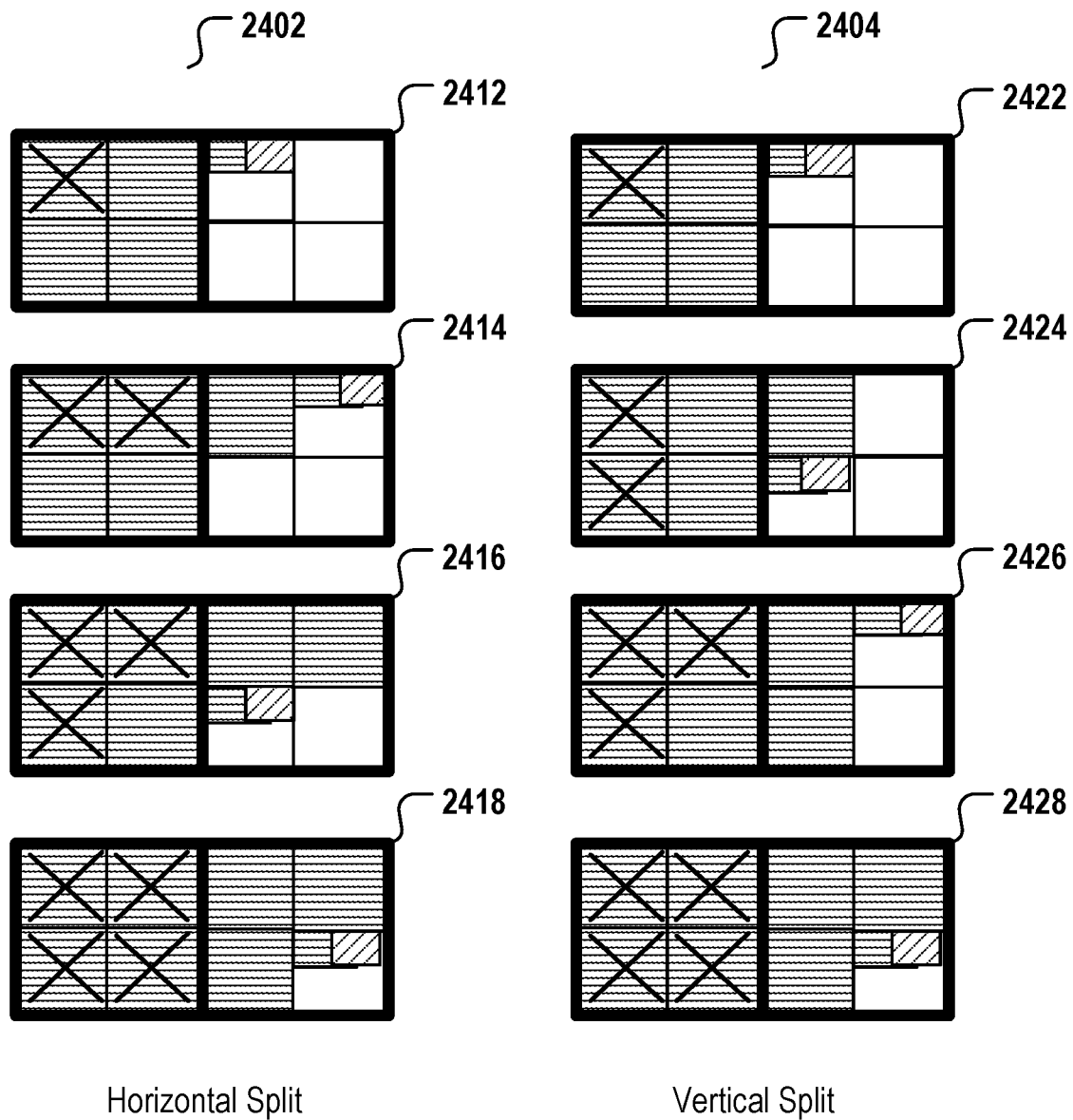
FIG. 24 illustrates a comparison of spatial views of an example RSM updating mechanism for IBC for horizontally split super block and vertically split super block.

The coding order of the 64×64 areas and corresponding RSM update order may follow either a horizontal scan (as shown above in FIG. 23) or vertical scan. Horizontal scan starts from top-left, to top right, bottom left, and bottom right. Vertical scan starts from top-left, to bottom left, to top right, and to bottom left. The left neighbor SB and current SB reference sample update processes for the horizontal scan and vertical scan are respectively illustrated in panel 2402 and 2404 of FIG. 24 for comparison when the each of the four 64×64 areas of the current SB is being reconstructed. In FIG. 24, the 64×64 areas shaded with horizontal lines without crosses represent areas with samples available for IBC. The areas shaded with horizontal lines with crosses represent the areas of the left neighboring SB that have been updated to the corresponding reconstructed samples of the current SB. The unshaded regions represent unprocessed regions of the current SB. The blocks shaded with slanted lines represent the current coding block being processed.

As shown in FIG. 24, depending on the location of the current coding block relative to the current SB, the following restrictions with respect to reference block for IBC may apply.

If the current block falls into the top-left 64×64 area of the current SB, then in addition to the already reconstructed samples in the current SB, it can also refer to the reference samples in the bottom-right, bottom-left and top-right 64×64 block of the left SB, as shown in 2412 (for horizontal scan) and 2422 (for vertical scan) of FIG. 24.

If the current block falls into the top-right 64×64 block of the current SB, then in addition to the already reconstructed samples in the current SB, if luma sample located at (0, 64) relative to the current SB has not yet been reconstructed, the current block can also refer to the reference samples in the bottom-left 64×64 block and bottom-right 64×64 block of the left SB (2414 of FIG. 24). Otherwise, the current block can also refer to reference samples in bottom-right 64×64 block of the left SB (2426 of FIG. 24) for IBC.

If the current block falls into the bottom-left 64×64 block of the current SB, then in addition to the already reconstructed samples in the current SB, if luma location (64, 0) relative to the current SB has not yet been reconstructed, the current block can also refer to the reference samples in the top-right 64×64 block and bottom-right 64×64 block of the left SB (2424 of FIG. 24). Otherwise, the current block can also refer to the reference samples in the bottom-right 64×64 block of the left SB (2416 of FIG. 24) for IBC.

If the current block falls into the bottom-right 64×64 block of the current SB, it can only refer to the already reconstructed samples in the current SB (2418 and 2428 of FIG. 24) for IBC.

As described above, in some example implementations, either one of or both local and non-local-based CTU/SBs may be used for IBC reference block search and selection. In addition, when on-chip RSM is used for local reference, some of the restrictions as to availability of an already-constructed CTU/SB as IBC reference with respect to write back delay may be relaxed or removed. Such implementations may be applied regardless of whether parallel decoding is employed or not.

Figure 25:
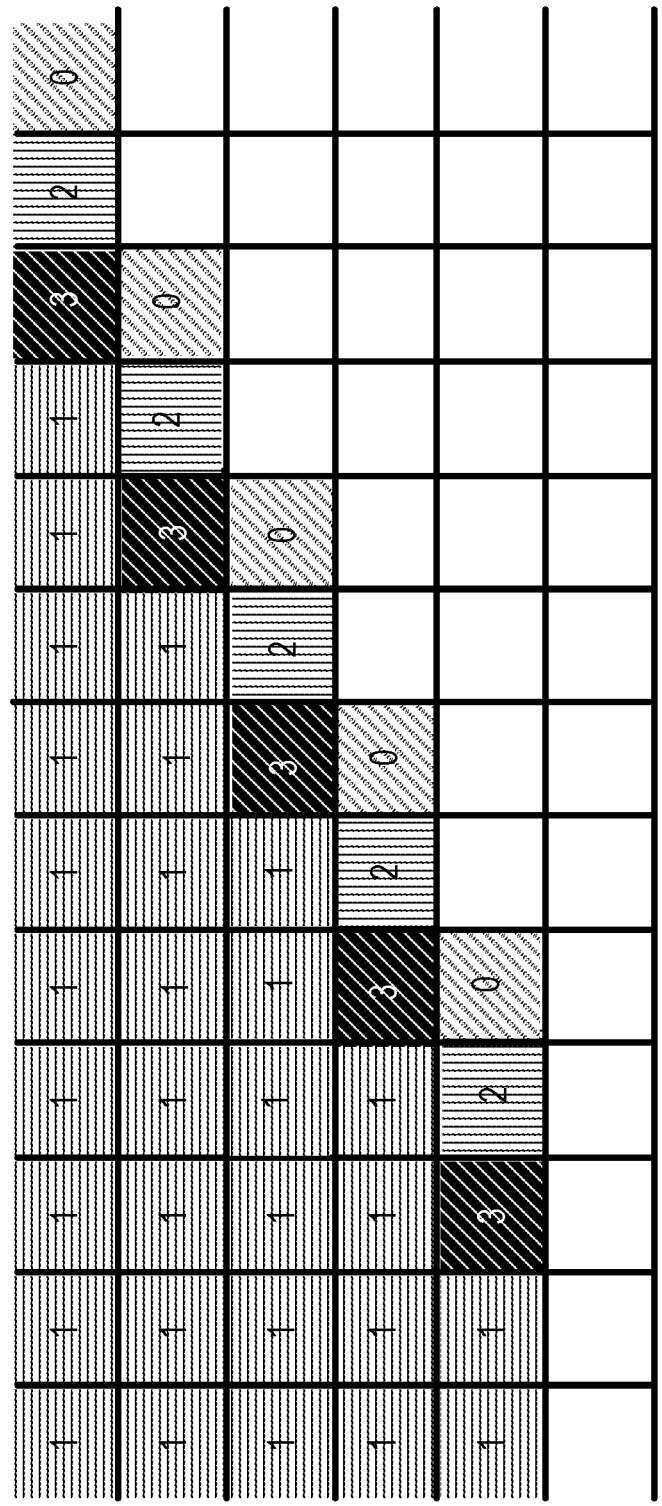
FIG. 25 illustrates example non-local and local search areas for IBC reference blocks.

Example implementations of the local and non-local reference CTU/SBs that may be used for IBC are shown in FIG. 25, where, again, each square represents a CTU/SB. The CTU/SBs shaded with slanted lines represent current CTU/SBs (Labeled as "0"), whereas the CTU/SBs shaded with horizontal lines (labeled as "1"), vertical lines (labeled as "2"), and inverted-slanted lines (labeled as "3") represent already-constructed areas. The unshaded CTU/SBs represent the areas that are yet to be reconstructed. It is assumed that the parallel decoding similar to that of FIG. 19 and FIG. 20 is used. The CTU/SBs shaded with vertical lines ("2") and inverted-slanted lines ("3") represent example areas normally restricted out as IBC references for the current CTU/SBs due to write back delay to DPB when only off-chip memory is used for IBC referencing (see FIG. 20). When on-chip RSM is used, one or more of the restricted areas of FIG. 20 may be referenced directly from the RSM and thus may not need to be restricted out. The number of the restricted areas that can now be accessed via RSM for IBC reference may depending on the size of the RSM. In the example of FIG. 25, it is assumed that the RSM can hold one CTU/SB and employ the RSM update mechanism described above. As such, left neighboring CTU/SB shaded in vertical lines and labeled as "2", may be available for local reference. The RSM then holds samples from the left CTU/SBs and the current CTU/SBs. Thus, in the example of FIG. 25, the search area available for non-local IBC reference blocks includes the CTU/SB labeled as "1" (search area 1 (SA1), or non-local search area), the search area available for local IBC reference blocks includes the CTU/SB labeled as "2" and "0" (this search area may be referred to as search area 2 (SA2), or local search area), and the restricted-out area for IBC reference blocks include the CTU/SB labeled as "3" due to writeback delay. In some other implementations, with sufficient on-chip RSM size that can hold the entire restricted CTU/SBs, all these potentially restricted areas are includable in the RSM for local referencing. For example, both left neighboring blocks labeled as "2" and "3" may be included in the local search area.

In some other implementations, only current CTU/SB labeled as "0", or a portion of the current CTU/SB may be included in the RSM for local referencing.

In some example implementations, the samples in SA1 may be stored in external memory.

In some example implementations, the samples in SA2 may be stored in on-chip memory.

In some example implementations, the external memory and the on-chip memory have different hardware characteristics, such as access speed, access clock, access bandwidth, and the like.

When performing the IntraBC prediction, a special condition may occur when a block vector is pointing to a block that is partially located in SA1 and partially located in SA2. Under this special condition, further restriction or handling may need to be applied before using this block as a prediction block.

In some example implementations, under this special condition, the block pointed to by the block vector is not allowed or is excluded to be used as a prediction block for IntraBC.

Figure 26:
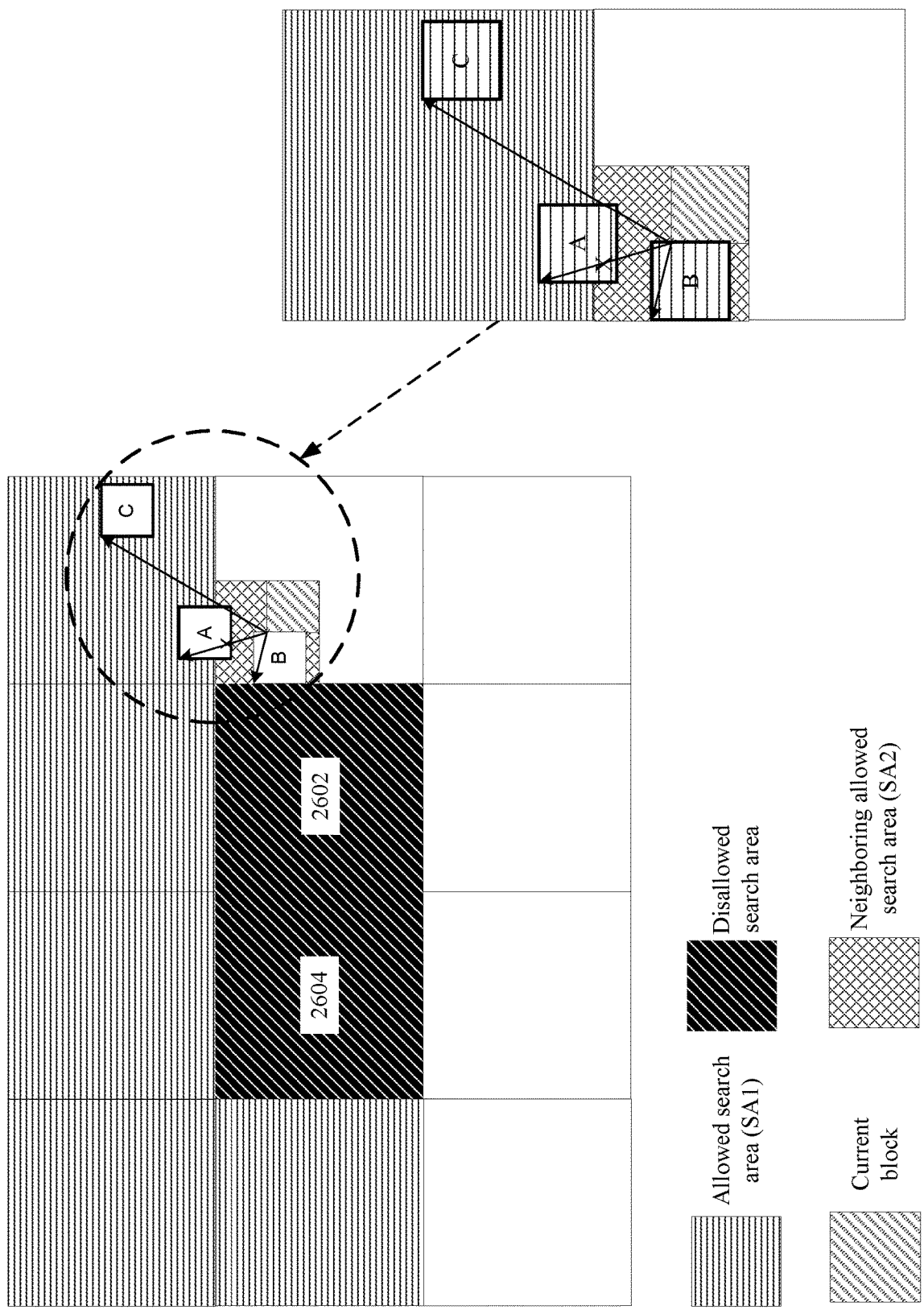
FIG. 26 shows example prediction blocks and proposed restriction on prediction block selection for IBC employing both local and non-local reference block search areas.

FIG. 26 shows various example blocks pointed to by respective block vectors. Block A is not allowed to be used as a prediction block since it overlaps with both SA1 and SA2; block B is allowed to be used as prediction block since it is completely included in SA2; and block C is allowed to be used as prediction block since it is completely included in SA1.

In some example implementations, if the block vector of IntraBC is pointing to a block (denoted by B) that is partially located in SA1 and partially located in SA2, it is proposed to either replace the samples in B that are overlapping with SA1 or replace the samples in B that are overlapping with SA2. The replacing of samples may be done by extending the boundary samples that can be used for prediction. For example, to replace the samples in B that are overlapping with SA1, boundary samples in SA2 may be used; to replace the samples in B that are overlapping with SA2, boundary samples in SA1 may be used.

In some example implementations, an overlapping area size may be used to determine which overlapping area the sample replacement should be applied to. If the overlapping area size between B and SA1 is more than the overlapping area size between B and SA2, then the samples located in the overlapping part between B and SA2 are replaced, and vice versa.

In some example implementations, a number of samples may be used to determine which overlapping area the sample replacement should be applied to. Denote the number of samples covered by the overlapping part between B and SA1 as S1, and the number of samples covered by the overlapping part between B and SA2 as S2. Samples located in the overlapping part between B and SA2 are replaced if S1 is greater than S2 multiplied by a weighting factor (t1) (i.e., S1>S2*t1), wherein t1 may be predefined, or signaled dynamically. Similarly, Samples located in the overlapping part between B and SA1 are replaced if S2 is greater than S1 multiplied by a weighting factor (t2), wherein the t2 may be predefined, or signaled dynamically.

In some example implementations, when sample replacement is applied to the overlapping part between B and SA1, the samples in SA2 may be used for replacing the samples in the overlapping part. Similarly, when sample replacing is applied on the overlapping part between B and SA2, the samples in SA1 may be used for replacing the samples in the overlapping part.

In some example implementations, as shown in FIG. 26, CTU/SB 2602 and 2604 form a disallowed area. However, in some other implementations, CTU/SB 2602 and/or 2604 may also be part of local search area (or neighboring allowed search area, SA2). For example, if the on-chip memory is big enough to hold samples in 2602 and/or 2604.

In some example implementations, the implementation of prediction may use two reference blocks. This mode of prediction may be referred to as a compound prediction mode. A compound prediction may be characterized by the formula below:

$$P(x,y)=(w(x,y) \cdot P_0(x,y)+(64-w(x,y)) \cdot P_1(x,y)+32)>>6 \quad (1)$$

where P0(x, y) and P1(x, y) refer to the prediction samples from two reference blocks for the current sample located at (x, y) in a current block, w(x, y) is the weighting factor applied to the prediction sample from the first reference block, and P(x, y) is the final compound prediction. Depending on the derivations of the weighting factor and prediction block, there may be different compound motion prediction modes.

For example, an average predictor mode may be implemented where two references are equally weighted. In this case, w(x, y)=32.

For example, a distance weighted predictor mode may be implemented, where the weighting factor may be determined by the temporal distance between the current block and its two reference blocks.

as described in the following subsections. For SKIP mode using two reference blocks, w(x, y) is always set to 32.

In some example implementations, the compound prediction may be applied to an IntraBC predicted block.

In some example implementations, the compound prediction may be further applied to a wedge mode to form a compound wedge-based prediction mode. In this mode, for each block size, a set of 16 predefined two-dimensional weighting arrays may be predefined and/or hard coded. In each array, the weightings are arranged in such a way as to project to a predefined wedge partitioning pattern. In each Wedge partitioning pattern, two wedge partitions are specified along a certain edge direction and position. For samples located in one of the two wedge partitions, the weightings are mostly set as 64. In one implementation, the weightings may gradually change from 64 to 0 near the wedge partitioning boundary. For samples located in the other wedge partition, the weightings are mostly set as 0. Moreover, along the wedge partitioning boundary, the weightings may be valued as 32.

FIG. 27 shows 16 exemplary wedgelet partitioning patterns (a-p). In these examples, square blocks are used. Similar partitioning may also apply to rectangular blocks.

Within each block, there is boundary line dividing the block into two partitions. Each boundary line may have a different starting point, an end point, and a different angle. In wedge-based prediction mode, two syntaxes may be predefined: wedge_index, which specifies the wedge partitioning pattern index. For example, the wedge_index may range from 0 to 15, with each index value indicates a particular wedge partitioning pattern; and wedge_sign, which specifies which of the two partitions is to be assigned the dominant weighting.

In some example implementations, the compound wedge-based prediction mode may be applied to an IntraBC predicted block. In this case, the IntraBC predicted block may be partitioned into multiple partitions following a specific wedgelet partitioning pattern. At least one partition may be assigned with multiple reference blocks for the purpose of compound prediction.

Figure 28:
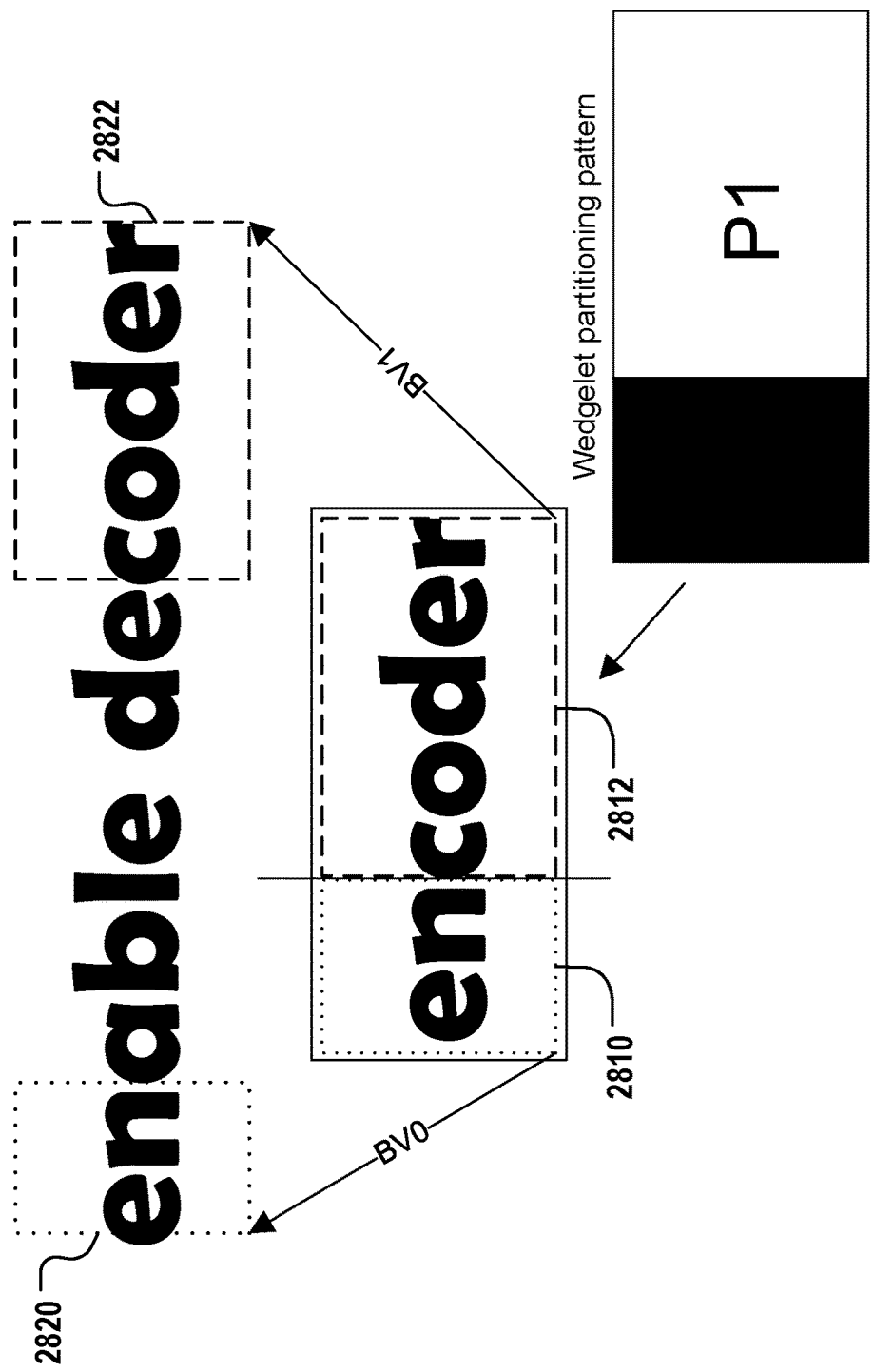
FIG. 28 shows an example IntraBC block partitioned into two regions using wedgelet partitioning, with each region having a block vector for locating a respective reference block.

In some example implementations for IntraBC prediction, for a current block (e.g., a block currently under re-construction), only a single block vector is employed to locate the reference block. However, in many cases of screen content, e.g., text images, the reference block can match perfectly for only part of the current block but does not match for the other part of the block. Referring to FIG. 28, when matching two text image blocks showing words "encoder" and "decoder" respectively, the right "coder" part of the two words match perfectly, however the left parts do not match at all (i.e., "en" vs. "de"), and it results in big distortion if a single vector is used to fetch the text image block "decoder" for predicting the text image block "encoder".

In some example implementations, IntraBC prediction may be combined with wedgelet partitioning. For an IntraBC coded block using wedgelet partitioning, rather than only using a single block vector for prediction, multiple block vectors may be employed. For example, a current block may firstly be partitioned into multiple regions using, for example, wedgelet partitioning mode, then for each region, a specific block vector is used for locating the predictor associated with this region.

FIG. 28 further shows an example implementation using multiple block vectors. As shown in FIG. 28, the text image block containing word "encoder" is partitioned using a wedgelet partitioning mode with a vertical partitioning boundary (e.g., by using partition (1) in FIG. 27), and two partitions (2810 and 2812) are generated, with partition 2810 containing the text image with "en" and partition 2812 containing the text image with "coder". In this example, two different block vectors BV0 and BV1 are used for these two partitions respectively to find their reference blocks in the current frame, i.e., the "en" part 2820 in the text image block containing word "enable" and the "coder" part 2822 in the text image block containing word "decoder".

In one implementation, for an IntraBC coded block, a flag may be used for indicating whether wedgelet partitioning mode is applied. The flag may be signaled in the video bitstream.

In one implementation, when wedgelet partitioning mode is applied on an IntraBC coded block, an index indicating the wedgelet partitioning pattern may be signaled. For example, the index may indicate one of wedgelet partitioning patterns (a-p) as shown in FIG. 27.

In one implementation, when wedgelet partitioning mode is applied on an IntraBC coded block, for each wedgelet partition, a block vector is used to identify the reference block. The block vector for different wedgelet partition may be different. For example, as shown in FIG. 28, two different block vectors, BV0 and BV1, are assigned to partitions 2810 and 2812, respectively.

In one implementation, a block vector used for one wedgelet partition may be used to predict the block vector used for another wedgelet partition in the same coded block. For example, in FIG. 28, BV0 may be used to predict BV1, and vice versa.

In one implementation, the block vector for each wedgelet partition may be generated from block vector(s) of neighboring coded blocks coded in IntraBC mode. In one example, a predictor block vector candidate list may be established for the current block, using block vectors of neighboring coded blocks, or history-based (or historical) block vectors. Then an index may be signaled for locating a base block vector (or reference block vector) in the list, and block vector prediction residues may be further signaled. A block vector for a wedgelet partition may then be generated by applying the vector prediction residues to the base block vector. This manner for obtaining block vector can be referred to as explicit signaling of block vector.

In another implementation, when wedgelet partitioning mode is applied on an IntraBC coded block, for each wedgelet partition, a block vector may be derived from previously coded block vectors, rather than using the manner as described above. In one example, a predictor block vector candidate list may be established for the current block, using block vectors of neighboring coded blocks, or history-based block vectors. An index may be signaled for locating a base block vector in the list, and then block vector for a wedgelet partition may be derived from the base block vector without any signaled vector prediction residues. This manner for obtaining block vector can be referred to as implicit signaling of block vector. The derivation of the block vector from the base block vector may be based on a predefined or preconfigured transformation.

Alternatively, in one implementation, the base block vector described above may be used directly as the block vector for a wedgelet partition.

The combination of explicit and implicit signaling of block vector is allowed. For example, for a wedgelet partitioning with two partitions, the first partition may use implicit signaling while the second partition may use explicit signaling for block vector coding. For example, in FIG. 28, BV0 may be predicted using explicit signaling, and BV1 may be derived using implicit signaling.

In one implementation, when combined with IntraBC prediction, only certain wedgelet partitioning patterns are allowed. For example, these wedgelet partitioning patterns may only include partitioning modes with horizontal boundary (such as patterns h and p in FIG. 27), and/or vertical partitioning boundary (such as patterns d and l in FIG. 27).

In one implementation, when combined with IntraBC prediction, only wedgelet partitioning patterns with vertical partitioning boundary are allowed.

In one implementation, the types of allowed wedgelet partitioning patterns may be signaled via high-level syntax which may include at least one of:
- a Video Parameter Set (VPS) syntax;
- a Picture Parameter Set (PPS) syntax;
- a Sequence Parameter Set (SPS) syntax;
- an Adaptive Parameter Set (APS) syntax;
- a slice header;
- a picture header;
- a frame header; or
- a tile header.

In one implementation, the types of allowed wedgelet partitioning patterns may apply to various levels. For example, the types of allowed wedgelet partitioning patterns may be signaled at various headers corresponding to various block levels. The various headers may include at least one of: a CTU header (so the wedgelet partitioning pattern applies to a whole CTU), a superblock header (so the wedgelet partitioning pattern applies to a whole superblock), a coding block header (so the wedgelet partitioning pattern applies to a whole coding block).

In one implementation, when wedgelet partitioning mode is applied on an IntraBC coded block, the compound prediction mode as described earlier may be further applied. In this case, the weighting factor w(x, y) used in equation 1 may be either 0 or a specific non-zero value (e.g., 64). In one implementation, the weighting factor w(x, y) may be predefined and/or hardcoded. In one implementation, the weighting factor w(x, y) may be signaled.

In one implementation, when wedgelet partitioning mode is applied on an IntraBC coded block, for each sub-partition, search area restriction may further apply. Referring back to FIG. 26 and as described earlier, for the current block, there exists two allowed search area: SA1 and SA2, while 2602 and 2604 representing disallowed search area. In this implementation, further constraint may be imposed on the reference partition (e.g., reference partition 2820 pointed to by BV0 and reference partition 2822 pointed to by BV1, as shown in FIG. 28): each entire reference partition should be inside a same allowed reference area defined for current block coded in IntraBC mode. For example, the whole reference partition 2820 may need to be inside either SA1 or SA2, and the whole reference partition 2820 may also need to be inside either SA1 or SA2. That is, a reference partition is not allowed to go across different search areas. If a reference partition goes across two search areas, or if at least a portion of the reference partition is located in a disallowed search area, a substitute method should be used for locating reference samples.

The present disclosure describes methods, apparatus, and computer-readable medium for video encoding/decoding. The present disclosure addressed various issues with IntraBC. The methods, devices, and computer-readable medium described in the present disclosure may enhance the performance of video codec, optimize IntraBC prediction using wedgelet partition mode.

Figure 29:
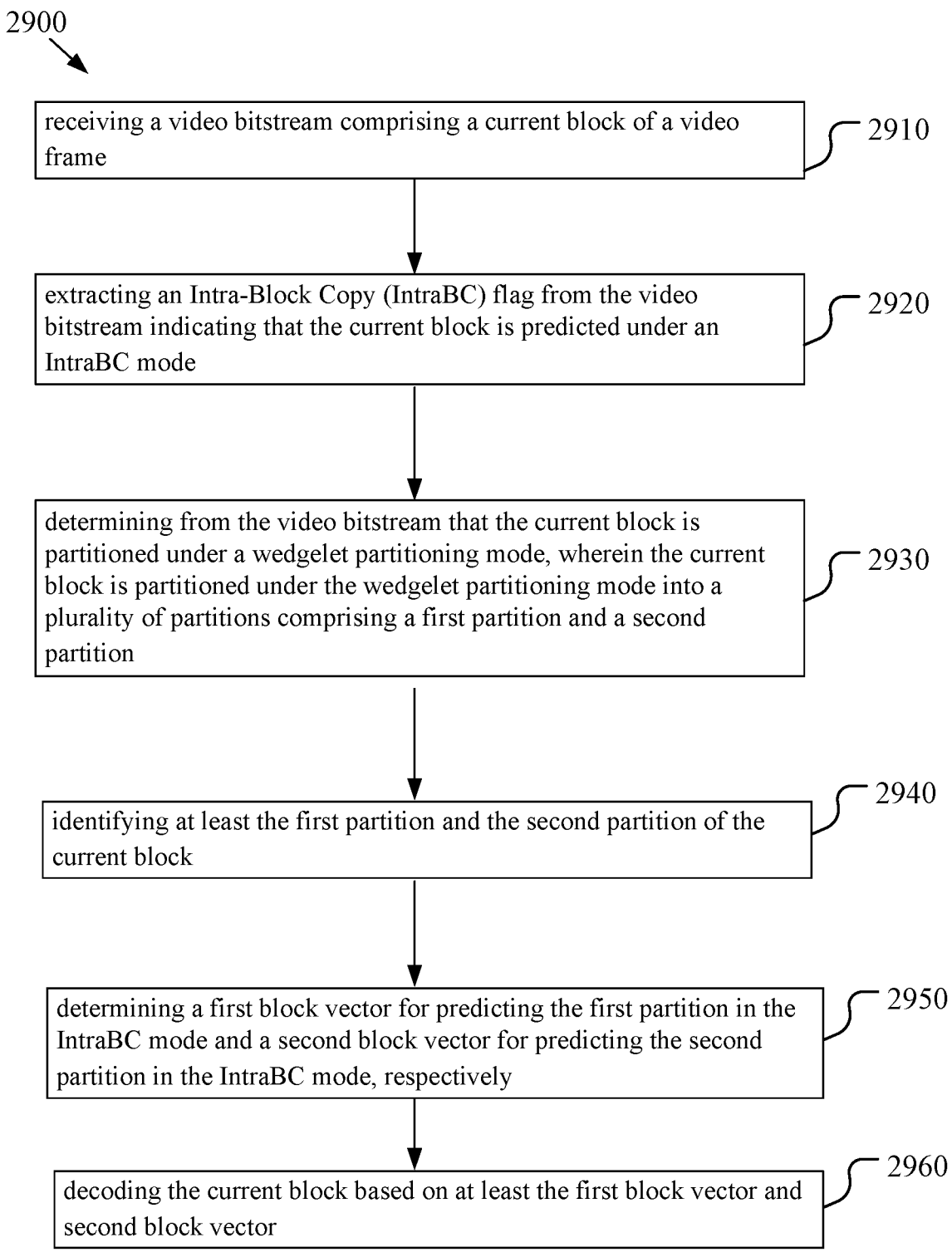
FIG. 29 shows a flow chart of method according to an example embodiment of the disclosure.

FIG. 29 shows an exemplary method 2900 for processing video data. The method 2900 may include a portion or all of the following step: step 2910, receiving a video bitstream comprising a current block of a video frame; step 2920, extracting an Intra-Block Copy (IntraBC) flag from the video bitstream indicating that the current block is predicted under an IntraBC mode; step 2930, determining from the video bitstream that the current block is partitioned under a wedgelet partitioning mode, wherein the current block is partitioned under the wedgelet partitioning mode into a plurality of partitions comprising a first partition and a second partition; step 2940, identifying at least the first partition and the second partition of the current block; step 2950, determining a first block vector for predicting the first partition in the IntraBC mode and a second block vector for predicting the second partition in the IntraBC mode, respectively, and step 2960, decoding the current block based on at least the first block vector and second block vector.

In the embodiments and implementation of this disclosure, any steps and/or operations may be combined or arranged in any amount or order, as desired. Two or more of the steps and/or operations may be performed in parallel.

Embodiments and implementations in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block. The term block may be interpreted as a prediction block, a coding block, or a coding unit, i.e. CU. The term block here may also be used to refer to the transform block. In the following items, when saying block size, it may refer to either the block width or height, or maximum value of width and height, or minimum of width and height, or area size (width*height), or aspect ratio (width:height, or height:width) of the block.

The techniques described above, can be implemented as computer software using computer-readable instructions and physically stored in one or more computer-readable media. For example, FIG. 30 shows a computer system (3000) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 30:
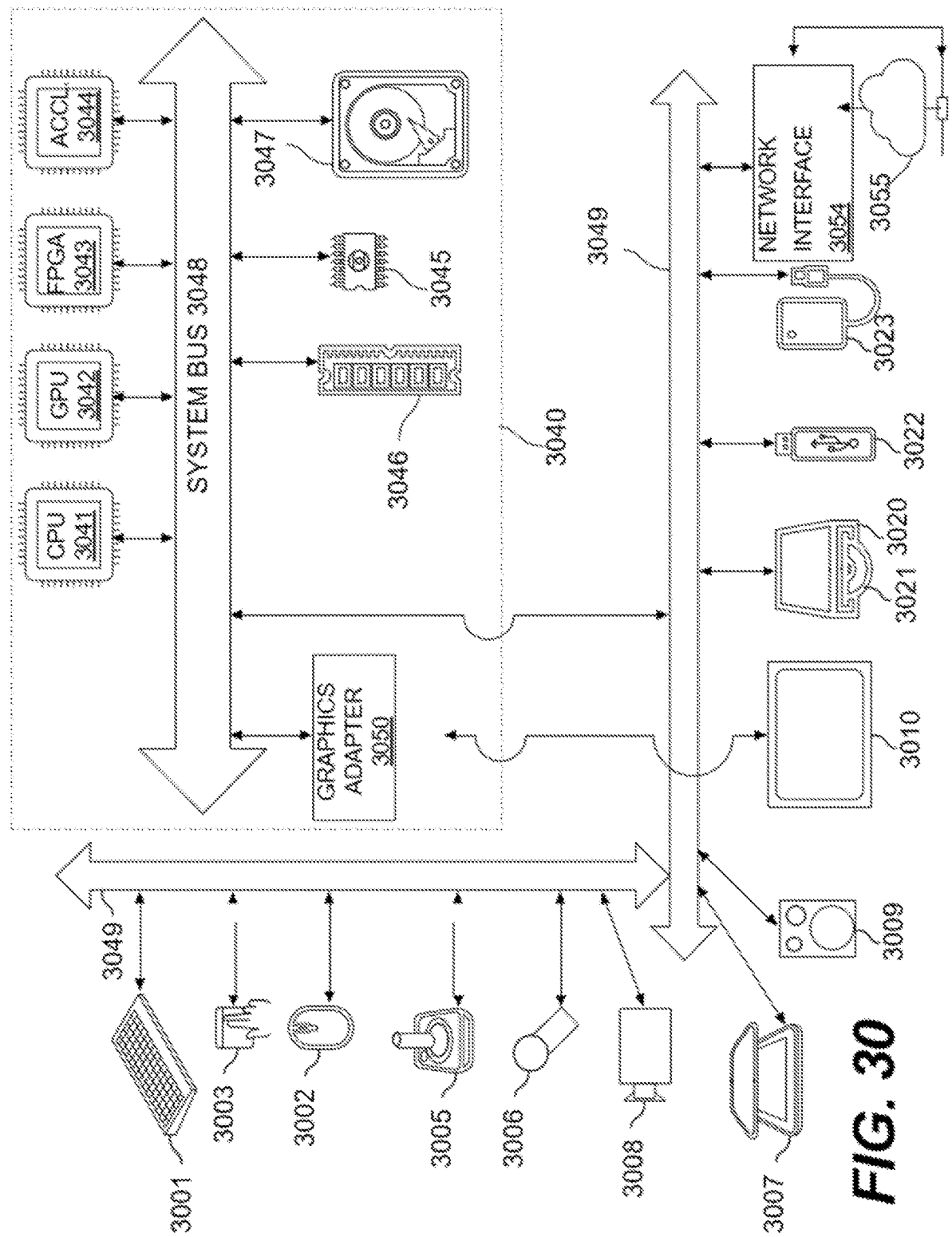
FIG. 30 shows a schematic illustration of a computer system in accordance with example embodiments of the disclosure.

The components shown in FIG. 30 for computer system (3000) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (3000).

Computer system (3000) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (3001), mouse (3002), trackpad (3003), touch screen (3010), data-glove (not shown), joystick (3005), microphone (3006), scanner (3007), camera (3008).

Computer system (3000) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (3010), data-glove (not shown), or joystick (3005), but there can also be tactile feedback devices that do not serve as input devices), audio output devices (such as: speakers (3009), headphones (not depicted)), visual output devices (such as screens (3010) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (3000) can also include human accessible storage devices and their associated media such as optical media including CD/DVD ROM/RW (3020) with CD/DVD or the like media (3021), thumb-drive (3022), removable hard drive or solid state drive (3023), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (3000) can also include an interface (3054) to one or more communication networks (3055). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth. Certain networks commonly require external network interface adapters that attached to certain general-purpose data ports or peripheral buses (3049) (such as, for example USB ports of the computer system (3000)); others are commonly integrated into the core of the computer system (3000) by attachment to a system bus as described below (for example Ethernet interface into a PC computer system or cellular network interface into a smartphone computer system). Using any of these networks, computer system (3000) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (3040) of the computer system (3000).

The core (3040) can include one or more Central Processing Units (CPU) (3041), Graphics Processing Units (GPU) (3042), specialized programmable processing units in the form of Field Programmable Gate Areas (FPGA) (3043), hardware accelerators for certain tasks (3044), graphics adapters (3050), and so forth. These devices, along with Read-only memory (ROM) (3045), Random-access memory (3046), internal mass storage such as internal non-user accessible hard drives, SSDs, and the like (3047), may be connected through a system bus (3048). In some computer systems, the system bus (3048) can be accessible in the form of one or more physical plugs to enable extensions by additional CPUs, GPU, and the like. The peripheral devices can be attached either directly to the core's system bus (3048), or through a peripheral bus (3049). In an example, the screen (3010) can be connected to the graphics adapter (3050). Architectures for a peripheral bus include PCI, USB, and the like.

CPUs (3041), GPUs (3042), FPGAs (3043), and accelerators (3044) can execute certain instructions that, in combination, can make up the aforementioned computer code. That computer code can be stored in ROM (3045) or RAM (3046). Transitional data can also be stored in RAM (3046), whereas permanent data can be stored for example, in the internal mass storage (3047). Fast storage and retrieve to any of the memory devices can be enabled through the use of cache memory, that can be closely associated with one or more CPU (3041), GPU (3042), mass storage (3047), ROM (3045), RAM (3046), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As a non-limiting example, the computer system having architecture (3000), and specifically the core (3040) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (3040) that are of non-transitory nature, such as core-internal mass storage (3047) or ROM (3045). The software implementing various embodiments of the present disclosure can be stored in such devices and executed by core (3040). A computer-readable medium can include one or more memory devices or chips, according to particular needs. The software can cause the core (3040) and specifically the processors therein (including CPU, GPU, FPGA, and the like) to execute particular processes or particular parts of particular processes described herein, including defining data structures stored in RAM (3046) and modifying such data structures according to the processes defined by the software. In addition or as an alternative, the computer system can provide functionality as a result of logic hardwired or otherwise embodied in a circuit (for example: accelerator (3044)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

APPENDIX A: ACRONYMS

IBC: Intra-Block Copy
IntraBC: Intra-Block Copy
JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
HDR: high dynamic range
SDR: standard dynamic range
JVET: Joint Video Exploration Team
MPM: most probable mode
WAIP: Wide-Angle Intra Prediction
CU: Coding Unit
PU: Prediction Unit
TU: Transform Unit
CTU: Coding Tree Unit
PDPC: Position Dependent Prediction Combination
ISP: Intra Sub-Partitions
SPS: Sequence Parameter Setting
PPS: Picture Parameter Set
APS: Adaptation Parameter Set
VPS: Video Parameter Set
DPS: Decoding Parameter Set
ALF: Adaptive Loop Filter
SAO: Sample Adaptive Offset
CC-ALF: Cross-Component Adaptive Loop Filter
CDEF: Constrained Directional Enhancement Filter
CCSO: Cross-Component Sample Offset
LSO: Local Sample Offset
LR: Loop Restoration Filter
AV1: AOMedia Video 1
AV2: AOMedia Video 2
RPS: Reference Picture Set
DPB: Decoded Picture Buffer
MMVD: Merge Mode with Motion Vector Difference
IntraBC or IBC: Intra Block Copy
BV: Block Vector
BVD: Block Vector Difference
RSM: Reference Sample Memory

What is claimed is:

1. A method for processing video data, the method comprising:
   receiving a video bitstream comprising a current block of a video frame;
   extracting an Intra-Block Copy (IntraBC) flag from the video bitstream indicating that the current block is predicted under an IntraBC mode;
   determining from the video bitstream that the current block is partitioned under a wedgelet partitioning mode, wherein the current block is partitioned under the wedgelet partitioning mode into a plurality of partitions comprising a first partition and a second partition;
   identifying at least the first partition and the second partition of the current block;
   generating a list of candidate block vectors based on at least one of: block vectors from neighboring blocks of the current block, or historical block vectors, the list of candidate block vectors comprising at least one candidate block vector;
   extracting, from the video bitstream, a third indicator indicating a target block vector in the list of candidate block vectors;
   selecting the target block vector from the list of candidate block vectors according to the third indicator;
   generating, based on the target block vector, at least one of: a first block vector for predicting the first partition in the IntraBC mode; or a second block vector for predicting the second partition in the IntraBC mode; and
   decoding the current block based on at least the first block vector and second block vector.

2. The method of claim 1, wherein determining from the video bitstream that the current block is partitioned under the wedgelet partitioning mode comprises:
   extracting, from the video bitstream, a first indicator for indicating the wedgelet partitioning mode for the current block; and
   determining that the current block is partitioned under the wedgelet partitioning mode based on the wedgelet partitioning mode indicator.

3. The method of claim 1, wherein:
   the method further comprises extracting, from the video bitstream, a second indicator associated with the current block and indicating a pattern of the wedgelet partitioning mode; and
   identifying the first partition and the second partition of the current block comprises identifying the first partition and the second partition based on the second indicator.

4. The method of claim 3, wherein the pattern of the wedgelet partitioning mode comprises one of:
   a vertical partitioning pattern in which the first partition and the second partition are divided by a vertical boundary in the current block; or
   a horizontal partitioning pattern in which the first partition and the second partition are divided by a horizontal boundary.

5. The method of claim 3, wherein extracting, from the video bitstream, the second indicator comprises:
   extracting the second indicator from the video bitstream via a high-level syntax, the high-level syntax comprising at least one of:
      a Video Parameter Set (VPS) syntax;
      a Picture Parameter Set (PPS) syntax;
      a Sequence Parameter Set (SPS) syntax;
      an Adaptive Parameter Set (APS) syntax;
      a slice header;
      a picture header;
      a frame header; or
      a tile header.

6. The method of claim 3, wherein:
   extracting, from the video bitstream, the second indicator comprises extracting the second indicator via a block-level signal from the video bitstream;
   the block-level signal is transmitted in one of:
      a Coding Tree Unit (CTU) header;
      s superblock header; or
      a coding block header; and
   the second indicator applies to one of:
      a CTU comprising the current block in response to the block-level signal being transmitted in the CTU header;
      a superblock comprising the current block in response to the block-level signal being transmitted in the superblock header; or
      a coding block comprising the current block in response to the block-level signal being transmitted in the coding block header.

7. The method of claim 1, wherein the first block vector and second block vector are different.

8. The method of claim 7, wherein extracting the second block vector for the second partition comprises predicting the second block vector based on the first block vector.

9. The method of claim 1, wherein generating at least one of the first block vector or the second block vector based on the target block vector comprises:
   extracting, from the video bitstream, vector prediction residues associated with the first block vector; and
   generating the first block vector based on the target block vector and the vector prediction residues.

10. The method of claim 1, wherein generating at least one of the first block vector or the second block vector based on the target block vector comprises deriving the second block vector from the target block vector.

11. The method of claim 10, wherein deriving the second block vector from the target block vector comprises generating the second block vector from the target block vector using a predefined transformation.

12. The method of claim 1, wherein the first block vector points to an IntraBC prediction block in a current frame of the current block, and the IntraBC prediction block is determined by an encoder of the video bitstream by:
   determining a first search area in the video frame, wherein the first search area is a first candidate area for locating the IntraBC prediction block, wherein the first search area has no overlap with the current block and comprises a list of blocks, the IntraBC prediction block being a prediction block for performing IntraBC prediction on the first partition;
   determining a second search area, wherein the second search area is a second candidate area for locating the IntraBC prediction block, the second search area comprising at least one of: (i) a sub-block of the current block, and (ii) an adjacent block of the current block; and
   identifying the IntraBC prediction block pointed to by the first block vector which does not cross search areas.

13. The method of claim 12, wherein:
   a top left pixel of the current block has a coordinate position of (x0, y0);
   a top left pixel of each block in the list of blocks has a coordinate position of (x, y);

y is less than y0; and x is less than [x0+2 (y0−y)−D], where x0, y0, x, and y are non-negative numbers, D is a number of immediate reconstructed blocks that is restricted for IntraBC mode.

14. A device for processing video data, the device comprising a memory for storing computer instructions and a processor in communication with the memory, wherein, when the processor executes the computer instructions, the processor is configured to cause the device to:

receive a video bitstream comprising a current block of a video frame;

extract an Intra-Block Copy (IntraBC) flag from the video bitstream indicating that the current block is predicted under an IntraBC mode;

determine from the video bitstream that the current block is partitioned under a wedgelet partitioning mode, wherein the current block is partitioned under the wedgelet partitioning mode into a plurality of partitions comprising a first partition and a second partition;

identify at least the first partition and the second partition of the current block;

generate a list of candidate block vectors based on at least one of: block vectors from neighboring blocks of the current block, or historical block vectors, the list of candidate block vectors comprising at least one candidate block vector;

extract, from the video bitstream, a third indicator indicating a target block vector in the list of candidate block vectors;

select the target block vector from the list of candidate block vectors according to the third indicator;

generate, based on the target block vector, at least one of: a first block vector for predicting the first partition in the IntraBC mode; or a second block vector for predicting the second partition in the IntraBC mode; and decode the current block based on at least the first block vector and second block vector.

* * * * *